United States Patent
Gascan et al.

(10) Patent No.: US 12,486,545 B2
(45) Date of Patent: Dec. 2, 2025

(54) DIAGNOSTIC AND TREATMENT OF CHRONIC PATHOLOGIES SUCH AS LYME DISEASE

(71) Applicants: Centre National de la Recherche Scientifique, Paris (FR); Institut National de la Santé et de la Recherche Médicale, Paris (FR); Marc Michaël Bransten, Vincennes (FR)

(72) Inventors: Hugues Gascan, Angers (FR); Marc Michaël Bransten, Vincennes (FR); Sylvie Chevalier, Angers (FR); Hans Yssel, Paris (FR)

(73) Assignees: Centre National de la Recherche Scientifique, Paris (FR); Institut National de la Sante et de la Recherche Medicale, Paris (FR)

( * ) Notice: Subject to any disclaimer, the term of this patent is extended or adjusted under 35 U.S.C. 154(b) by 1535 days.

(21) Appl. No.: 16/647,231

(22) PCT Filed: Sep. 14, 2018

(86) PCT No.: PCT/EP2018/074835
§ 371 (c)(1),
(2) Date: Mar. 13, 2020

(87) PCT Pub. No.: WO2019/053175
PCT Pub. Date: Mar. 21, 2019

(65) Prior Publication Data
US 2024/0182985 A1   Jun. 6, 2024

(30) Foreign Application Priority Data

Sep. 15, 2017   (EP) .................................... 17306194

(51) Int. Cl.
*C12Q 1/689*   (2018.01)
*G01N 33/569*   (2006.01)
*G16B 25/10*   (2019.01)

(52) U.S. Cl.
CPC ....... *C12Q 1/689* (2013.01); *G01N 33/56911* (2013.01); *G16B 25/10* (2019.02); *C12Q 2600/158* (2013.01); *G01N 2333/535* (2013.01); *G01N 2333/57* (2013.01); *G01N 2333/7155* (2013.01)

(58) Field of Classification Search
CPC .............. C12Q 1/689; C12Q 2600/158; G01N 33/56911; G01N 2333/57; G01N 2333/7155; G16B 25/10
See application file for complete search history.

(56) References Cited

U.S. PATENT DOCUMENTS

2013/0296184 A1*  11/2013  Joosten .............. G01N 33/6869
435/6.12

FOREIGN PATENT DOCUMENTS

WO   2012/039614 A1   3/2012

OTHER PUBLICATIONS

Arend, William P. "The balance between IL-1 and IL-1Ra in disease." Cytokine & growth factor reviews 13.4-5 (2002): 323-340. (Year: 2002).*
Miller, Laurie C., et al. "Live Borrelia burgdorferi preferentially activate interleukin-1 beta gene expression and protein synthesis over the interleukin-1 receptor antagonist." The Journal of clinical investigation 90.3 (1992) (Year: 1992).*
Landskron, Glauben, et al. "Chronic inflammation and cytokines in the tumor microenvironment." Journal of immunology research 2014.1 (2014): 149185. (Year: 2014).*
Bernell et al. "Use Your Words Carefully: What Is a Chronic Disease?", Frontiers in Public Health, 2016 (Year: 2016).*
Hertze, Joakim et al. 'Evaluation of CSF Biomarkers as Predictors of Alzheimer's Disease: A Clinical Follow-Up Study of 4.7 Years'. Sep. 10, 2010 (Year: 2010).*
International Search Report issued in corresponding International Patent Application No. PCT/EP2018/074835 dated Oct. 10, 2018.
Written Opinion issued in corresponding International Patent Application No. PCT/EP2018/074835 dated Oct. 10, 2018.
Jarefors et al., "Decreased up-regulation of the interleukin-12Rβ2-chain and interferon-γ secretion and increased number of forkhead box P3-expressing cells in patients with a history of chronic Lyme borreliosis compared with asymtomatic Borrelia-exposed individuals," Clinical and Experimental Immunology, 147: 18-27 (2006).
Lubberts, "IL-17/Th17 targeting: On the road to prevent chronic destructive arthritis?" Cytokine, 41: 84-91 (2007).
Pfeiffer et al., "Prospective analysis of Borrelia specific T-cells by IFN-gamma-Elispot in patients with Borrelia-burgdorferi infection on antibiotic therapy," Infection, 29: 40-41 (2001).
Miller et al., "Live Borrelia-Burgdorferi Preferentially Activate Interleukin-1-β Gene Expression and Protein Synthesis Over the Interleukin-1 Receptor Antagonist," Journal of Clinical Investigation, 90: 906-912 (1992).
Miller et al., "Balance of synovial fluid IL-1-β and IL-1 receptor antagonist and recovery from Lyme arthritis," The Lancet, 341: 146-148 (1993).
Kuo et al., "Arthritis is inhibited in Borrelia-primed and infected interleukin-17A-deficient mice after administration of anti-gamma-interfereon, anti-tumor necrosis factor alpha and anti-interleukin-6 antibodies," Pathogens and Disease, 75: 1-7 (2017).

* cited by examiner

Primary Examiner — Olivia M. Wise
Assistant Examiner — Dawn Bickham
(74) Attorney, Agent, or Firm — Morgan, Lewis & Bockius LLP

(57) ABSTRACT

The present invention relates to several biomarkers, including IL-1RA, IFN-γ and GM-CSF, whose expressions at the mRNA level and at the protein level, correlate with chronic pathologies, such as Lyme disease, in particular the late chronic form of Lyme disease. More specifically, the invention provides methods and kits for the diagnosis of such chronic pathologies and for the assessment of a patient's response to a treatment, as well as methods and therapeutic agents for the treatment of such chronic pathologies.

5 Claims, 6 Drawing Sheets

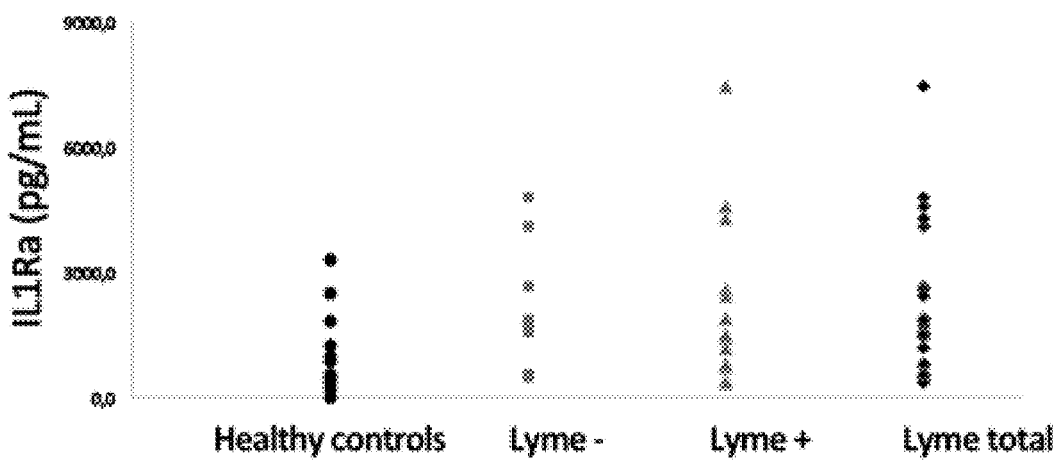
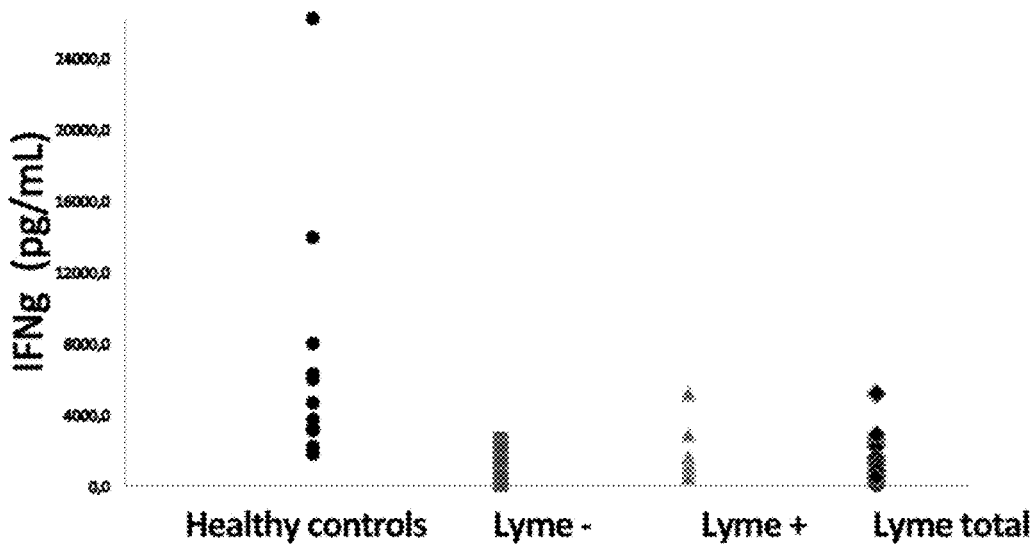
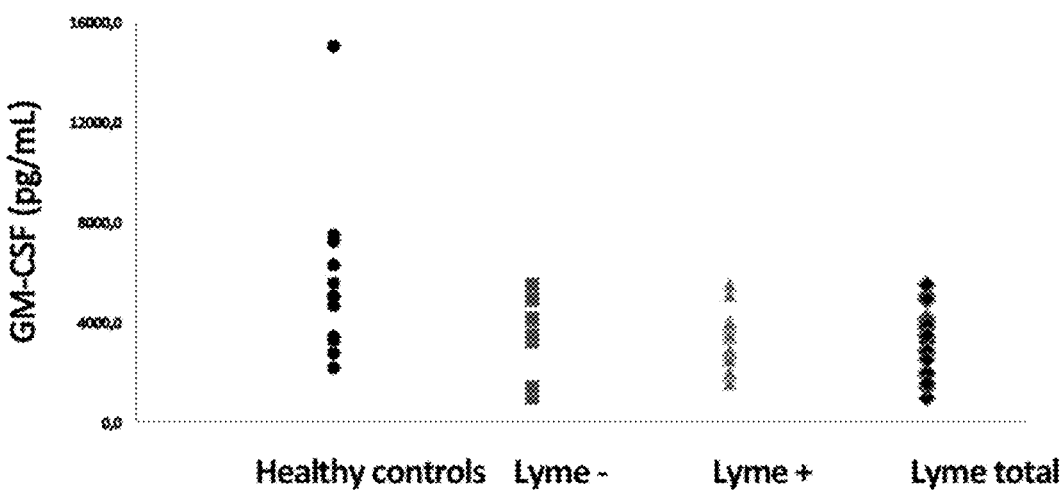
FIG. 1(A)-(C)

A

"COLD DISEASE INDEX"

p-Value = 0.016

| | Name | Il-1-Ra | INFg | Il-1-Ra/INFg | |
|---|---|---|---|---|---|
| 3 | T1 | 556,98 | 7965,37 | 0,07 | ← Index in healthy donors |
| 4 | T2 | 508,52 | 6261,45 | 0,08 | |
| 5 | T3 | 180,68 | 2137,00 | 0,08 | |
| 6 | T4 | 1814,70 | 4651,07 | 0,39 | |
| 7 | T5 | 8,00 | 5969,77 | 0,00 | |
| 8 | T6 | 338,11 | 3739,74 | 0,09 | |
| 9 | T7 | 1250,80 | 3190,51 | 0,39 | |
| 10 | T8 | 999,59 | 1748,45 | 0,57 | |
| 11 | T9 | 454,00 | 13876,58 | 0,03 | |
| 12 | T10 | 3289,13 | 26183,76 | 0,13 | |
| 13 | T11 | 2485,36 | 3070,32 | 0,81 | |
| 14 | T12 | 875,26 | 3157,26 | 0,28 | |

Excluded (polypathol.)

(rows 16–21 — Index in chronic patients)

Excluded (polypathol.)

(rows 23–28)

Excluded (polypathol.)

(rows 30–41)

With a 0.4 cut off
=> 95% fiability (to be conforted)

FIG. 2(A)

A
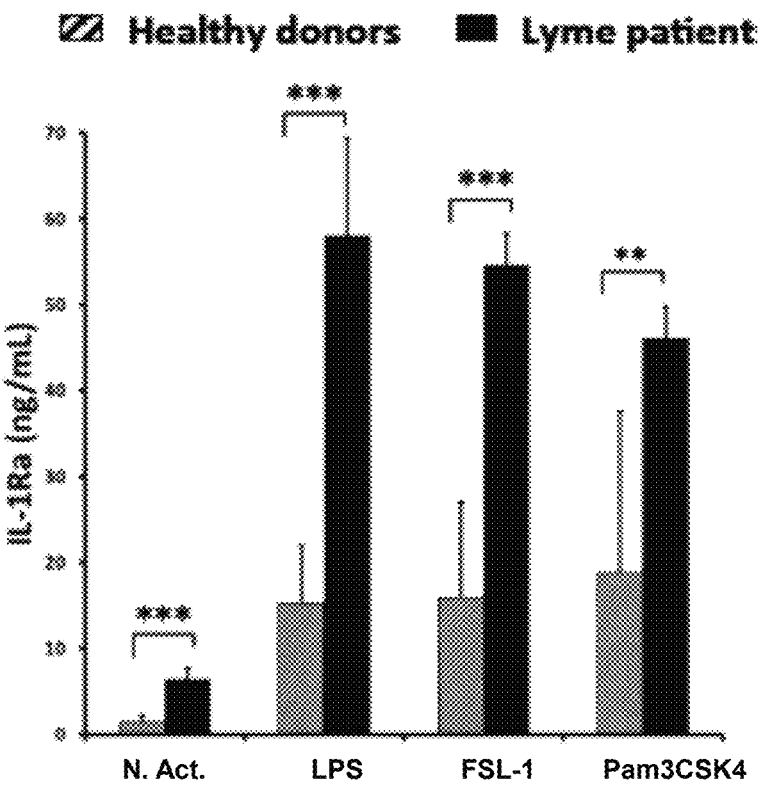
B
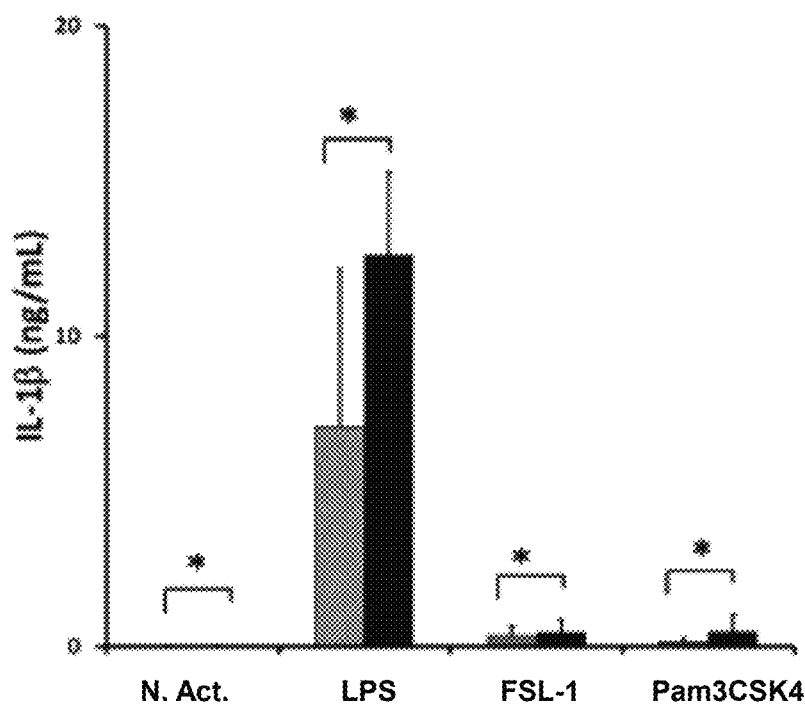
FIG. 5(A)-(B)

DIAGNOSTIC AND TREATMENT OF CHRONIC PATHOLOGIES SUCH AS LYME DISEASE

RELATED PATENTS APPLICATIONS

The present patent application is filed pursuant to 35 U.S.C § 371 as a U.S. National Phase Application of International Patent Application No. PCT/EP2018/074835, which was filed on Sep. 14, 2018, claiming the benefit of claims priority to European Patent Application No. EP 17 306 194 filed on Sep. 15, 2017. The content of each of the aforementioned patent applications, which is incorporated herein by reference in its entirety.

BACKGROUND OF THE INVENTION

Lyme disease, also known as Lyme borreliosis, is becoming a global health problem. Present on all continents, it is predominantly widespread in the Northen hemisphere and is endemic in the humid and wooded regions of the temperate countries of the American, European, Asian and African continents. Since the discovery of its bacterial origin in the early 1980s, Lyme disease has become the most common vector-borne disorder, and its incidence has even surpassed that of HIV (human immunodeficiency virus) in the United States. It was estimated that about 329,000 new cases occur annually in the United States (Nelson et al., Emerg. Infect. Dis., 2015, 21(9): 1625-1631). According to a report by the World Health Organisation (WHO, 2006), about 85,000 new cases are recorded each year in Europe, which strongly underestimates the reality, as all cases of Lyme disease are not diagnosed. The number of 33,000 new annual cases in France is also subject to debate, and may probably be closer to 100,000. The potential health threat caused by Lyme disease is slowly being recognized.

Lyme disease is an infectious disease caused by a bacterium belonging to the genus *Borrelia* and transmitted to humans via a tick bite. Inoculation of the bacterium *Borrelia* is sometimes associated with bacterial or parasitic co-infections (for example by microorganisms of the *Bartonella, Rickettsia*, or *Babesia* genus). Lyme disease is characterized by a great (genetic, epidemiological, clinical and diagnostic) diversity, because it is multivisceral (affecting various organs) and multisystemic (affecting various systems of the body). It can cause neurological, dermatological, articular, and more rarely cardiac or ophthalmic disorders. Lyme disease can be expressed and evolve for many years, going through three theoretical phases that can overlap in terms of symptoms and sometimes be interspersed by periods of latency.

The primary phase of Lyme disease occurs approximately 2 to 32 days after the tick bite and the main manifestation is a skin rash, called erythema chronicum migrans ("chronic migrating redness"), which is bullseye-shaped and located at the tick bite. The erythema is not always present or may go unnoticed. It may be accompanied with moderate fever, fatigue, muscle pain, and/or headache. The outcome is very favorable when the disease is diagnosed and treated early. In the absence of antibiotic treatment or spontaneous healing in the first stage of the disease, the progression to the secondary phase is not systematic, but worsens the prognosis. The secondary phase, which corresponds to the spread of the infection, takes place a few weeks to a few months or even years after infection. It is characterized by manifestations of the skin, the joints (joint pain, Lyme arthritis), the nerves (headaches, neuralgia), the heart (palpitations, and more rarely pericarditis or myocarditis), and/or the eyes (conjunctivitis, keratitis, or uveitis). The tertiairy or late form of Lyme disease corresponds to an agravation and chronic evolution of the symptoms. This stage of the disease is characterized by polyarthralgias migrating from one joint to another, chronic desocializing tiredness, muscular or osteomuscular pain, loss of cerebral concentration and anterograde memory problems, which may sometimes be accompanied with motor or cardiac impairments.

Today, there is no consensus treatment for the late chronic form of Lyme disease. Moreover, there is no reliable diagnostic tool. Consequently, the diagnosis is essentially based on the clinical picture and the medical practitioner's experience with this complex disorder. There are many ELISA and Western Blot tests, which allow the detection of antibodies secreted by the patient against bacteria of the *Borrelia* genus. However, only 50% of the patients with Lyme disease produce the desired antibodies, which leads to numerous false negatives, and a biological diagnosis that can only be random. Furthermore, only about 20% of patients have bacteremia (i.e., the presence of abnormal bacteria in the blood), which also renders hypothetical the diagnostic PCR approach carried out on blood samples. As a result, the diagnosis of Lyme disease is currently under intense controversy at both societal and medical levels, resulting in extensive media coverage as well as legal trials.

Thus, there is a need, in the art, for a reliable and robust method for the diagnostic of Lyme disease, in particular in its late, chronic form.

SUMMARY OF THE INVENTION

The present Inventors have analyzed the functional expression of the genome of circulating peripheral blood mononuclear cells in patients exhibiting a clinical picture characteristic of the late chronic phase of Lyme disease. This allowed them to demonstrate a major defect in the patients' response to the pathogen, which results in severe immunosuppression in their tissue inflammatory response. Several biomarkers have been identified, whose expression both the transcriptome and proteome levels, is indicative of the late chronic phase of Lyme disease. Three of these biomarkers have been validated, namely IL-1RA, INF-$\gamma$ and GM-CSF. To the Inventors' knowledge, it is the first time that a quantifiable and reliable biological signature of the late chronic form of Lyme disease is reported.

Consequently, in one aspect, the present invention relates to an in vitro method for diagnosing a chronic pathology in a subject, said method comprising steps of:

(a) determining, in a biological sample obtained from said subject, the expression level of interleukin-1 receptor antagonist (IL-1RA); and (b) comparing the expression level of IL-1RA determined in step (a) with the expression level of IL-1RA determined in a biological sample obtained from a healthy subject or with a predetermined threshold [IL-1RA]$_0$, wherein an expression level of IL-1RA determined in step (a) that is higher than the expression level of IL-1RA determined for the healthy subject, or that is higher than the predetermined threshold [IL-1RA]$_0$, is indicative of the chronic pathology, and/or comprising steps of:

(a') determining, in a biological sample obtained from said subject, the expression level of interferon-gamma (IFN-$\gamma$); and (b') comparing the expression level of IFN-$\gamma$ determined in step (a') with the expression level of IFN-$\gamma$ determined in a biological sample obtained from a healthy subject or with a predetermined threshold [IFN-γ]$_0$, wherein an expression level of IFN-γ determiner in step (a') that is lower than the expression level of IFN-γ determined for the healthy subject, or that is lower than the predetermined threshold [IFN-γ]$_0$, is indicative of the chronic pathology, and/or comprising steps of:
 (a") determining, in a biological sample obtained from said subject, the expression level of granulocyte-macrophage colony stimulating factor (GM-CSF): and
 (b") comparing the expression level of GM-CSF determined in step (a") with the expression level of GM-CSF determined in a biological sample obtained from a healthy subject or with a predetermined threshold [GM-CSF]$_0$, wherein an expression level of GM-CSF determiner in step (a") that is lower than the expression level of GM-CSF determined for the healthy subject, or that is lower than the predetermined threshold [GM-CSF]$_0$, is indicative of the chronic pathology.

The present invention also relates to an in vitro method for diagnosing a chronic pathology in a subject, said method comprising steps of:
 (a) determining, in a biological sample obtained from said subject, the expression level of IL-1RA and the expression level of IFN-γ: and
 (b) calculating the ratio [IL-1RA]/[IFN-γ] between the expression level of IL-1RA and the expression level of IFN-γ determined in step (a): and
 (c) comparing the ratio [IL-1RA]/[IFN-γ] calculated in step (b) with the ratio [IL-1RA]/[IFN-γ] determined using a biological sample obtained from a healthy subject or with a predetermined threshold ratio [IL-1RA]/[IFN-γ]$_0$, wherein a ratio [IL-1RA]/[IFN-γ] calculated in step (b) that is higher than the ratio [IL-1RA]/[IFN-γ] determined for the healthy subject, or that is higher than the predetermined threshold ratio [IL-1RA]/[IFN-γ]$_0$, is indicative of the chronic pathology:

and/or comprising steps of:
 (a') determining, in a biological sample obtained from said subject, the expression level of IL-1RA and the expression level GM-CSF:
 (b') calculating the ratio [IL-1RA]/[GM-CSF] between the expression level of IL-1RA and the expression level of GM-CSF determined in step (a): and
 (c') comparing the ratio [IL-1RA]/[GM-CSF] calculated in step (b') with the ratio [IL-1RA]/[GM-CSF] determined using a biological sample obtained from a healthy subject or with a predetermined threshold [IL-1RA]/[GM-CSF]$_0$, wherein a ratio [IL-1RA]/[GM-CSF] calculated in step (b') that is higher than the ratio [IL-1RA]/[GM-CSF] determined for a healthy subject, or that is higher than the predetermined threshold ratio [IL-1RA]/[GM-CSF]$_0$, is indicative of the chronic pathology.

In certain embodiments, the biological sample used in an in vitro method of diagnosis according to the invention is performed is a blood sample.

In certain embodiments, the step of determining the expression level of IL-1RA, IFN-γ or GM-CSF in a biological sample includes measuring the amount or concentration of IL-1RA mRNA, IFN-γ mRNA or GM-CSF mRNA in the biological sample or measuring the amount or concentration of IL-1RA protein, IFN-γ protein or GM-CSF protein in the biological sample.

In certain embodiments, the chronic pathology that is diagnosed using an in vitro method of diagnosis according to the invention is Lyme disease, in particular the late chronic form of Lyme disease.

In other embodiments, the chronic pathology that is diagnosed using an in vitro method of diagnosis according to the invention is selected from the group consisting of:
 autoimmune diseases with an unknown etiology, in particular multiple sclerosis, amyotrophic lateral sclerosis, systemic lupus erythematous, vasculitis, Kawasaki disease, uveitis, Dressler syndrome, myasthenia gravis, scleroderma, Gougerot-Sjögren syndrome, diabetes mellitus, celiac disease, and autoimmune thyroiditis:
 inflammatory diseases, in particular psoriasis, inflammatory bowel disease (Crohn's Disease and ulcerative colitis), rheumatoid arthritis, ankylosing spondylitis, osteoarthritis, atheroscloris, vasculitis, Horton vasculitis, and myasthenia gravis:
 neurodegenerative diseases, in particular Parkinson's disease, Alzheimer's disease, spinocerebellar ataxia, multisystematic atrophy, Alexander's Disease, progressive supranuclear palsy, and myofasciitis with macrophages:
 chronic infections caused by slow growing pathogens, in particular tuberculosis, leprosy, mycobacterial infections (e.g., Nontuberculosis mycobacterium infections, and Buruli ulcer); and Whipple disease:
 chronic fatigue syndrome:
 fibromyalgia; and
 pervasive developemental disorders such as autism spectrum disorders.

In still other embodiments, the chronic pathology is chronic fatigue syndrome, or fibromyalgia.

In a related aspect, the present invention relates to the use of an in vitro method according to the invention:
 for diagnosing the severity of the chronic pathology, or
 for assessing the evolution of the chronic pathology, or
 for assessing the response of the subject to a treatment, or
 for adapting the treatment to the subject, or
 for moniting the subject post-treatment, or
 for the early diagnosis of a relapse of the chronic pathology.

In another related aspect, the present invention relates to a reagent that specifically reacts with IL-1RA mRNA or protein, or with IFN-γ mRNA or protein, or with GM-CSF mRNA or protein, for use in the in vitro diagnosis of a chronic disease in a subject. The chronic disease may be any chronic disease described herein.

The reagent may be selected form the group consisting of oligonucleotide probes that specifically hybridize to IL-1RA mRNA transcript, oligonucleotide probes that specifically hybridize to IFN-γ mRNA transcript, oligonucleotide probes that specifically hybridize to GM-CSF mRNA transcript, oligonucleotide primers that specifically amplify IL-1RA mRNA transcript, oligonucleotide primers that specifically amplify IFN-γ mRNA transcript, oligonucleotide primers that specifically amplify GM-CSF mRNA transcript, antibodies that specifically recognize and bind the IL-1RA protein or a fragment thereof, antibodies that specifically recognize and bind the IFN-γ protein or a fragment thereof, antibodies that specifically recognize and bind the GM-CSF protein or a fragment thereof, protein-binding peptides that specifically bind to the IL-1RA protein or a fragment thereof, protein-binding peptides that specifically bind to the IFN-γ protein or a fragment thereof and protein-binding peptides that specifically bind to the GM-CSF protein or a fragment thereof.

In certain embodiments, the reagent is labeled with a directly or indirectly detectable moiety.

In still another related aspect, the present invention relates to a kit for use in the in vitro diagnosis of a chronic disease, said kit comprising a reagent that specifically reacts with IL-1RA mRNA or protein, or with IFN-γ mRNA or protein, or with GM-CSF mRNA or protein, as described herein, and instruction to perform a diagnosis according to a method of the invention.

In a different aspect, the present invention relates to a therapeutic agent for use in the treatment of a chronic pathology, wherein the therapeutic agent is selected among IL-1RA therapeutic agents, TLR10 therapeutic agents, GM-CSF, INF-γ and IL-2. The chronic pathology may be any of the chronic pathologies defined herein. The IL-1RA therapeutic agents may be IL-1α, IL-1β, anti-IL-1RA antibodies, or anti-IL-1RA interfering agents. The TLR10 therapeutic agents may be anti-TLR10 antibodies.

In a related aspect, the present invention relates to the use of a therapeutic agent, as defined herein, for the manufacture of a medicament for the treatment of a chronic pathology. The chronic pathology may be any of the chronic pathologies defined herein.

In yet another related aspect, the present invention relates to a method for treating a chronic pathology in a subject in need thereof, the method comprising a step of administering, to the subject, a therapeutically effective amount of a therapeutic agent, as described herein. The chronic pathology to be treated may be any of the chronic pathologies defined herein.

In still another related aspect, the present invention relates to a pharmaceutical composition for use in the treatment of a chronic pathology, comprising an effective amount of a therapeutic agent as defined herein and at least one pharmaceutically acceptable carrier or excipient. The chronic pathology to be treated may be any of the chronic pathologies defined herein. A pharmaceutical composition according to the present invention may further comprise at least one additional biologically active agent, which may be selected from the group consisting of anti-inflammatory agents, immunomodulatory agents, analgesics, antimicrobial agents, antibacterial agents, antibiotics, antioxidants, antiseptic agents, and combinations thereof.

These and other objects, advantages and features of the present invention will become apparent to those of ordinary skill in the art having read the following detailed description of the preferred embodiments.

DETAILED DESCRIPTION OF CERTAIN PREFERRED EMBODIMENTS

As mentioned above, the present invention stems from the identification of several biomarkers of chronic pathologies, in particular Lyme disease. The present invention also identifies these biomarkers as therapeutic targets for the treatment of chronic pathologies. Thus, the invention contains at least two main aspects: a diagnostic aspect and a therapeutic aspect.

I—Diagnostic Aspect

The term "*biomarker*", as used herein, refers to a substance which is a distinctive indicator of a biological process, biological event and/or pathological condition. Biomarkers identified in the study carried out by the present Inventors include IL-1RA (interleurkin 1 antagonist receptor), INF-γ (interferon gamma), GM-SCF (granulocyte-macrophage colony-stimulating factor), SSP1 (secreted phosphoprotein 1 or osteopontin), APOBEC3B (apolipoprotein B mRNA editing enzyme catalytic subunit 3B), TNFAIP6 (tumor necrosis factor-inducible gene 6 product), CCL20 (C-C modif chemokine 20), IL6 (interleurkin-6), OSM (oncostatin), C3 (complement component 3), RGS16 (regulator of G-protein signaling), AFF3 (AF4/FMR2 family member 1), AKR1C1 (aldo keto reductase family 1 member 1), CD163 (cluster differentiation 163), MRS1 (macrophage scavenger receptor 1), IL13 (interleukin 13), CCL8 (chemokine C-C motif ligand 8), IL22 (interleukin 22), IL17F (interleukin 17F), IL17A (interleukin 17A), and IL3 (interleukin 3). Among these biomarkers, a first wave of three has been validated, which are described in more detail below.

A. IL-1RA, IFN-γ and GM-CSF as Biomarkers of Chronic Pathologies

The present invention provides the identity of three genes, the IL-1RA, IFN-γ and GM-CSF genes, whose over-expression (in the case of IL-1RA) and under-expression (in the case of IFN-γ and GM-CSF), at the transcriptome and proteome levels, were found to be indicative of the late chronic form of Lyme disease.

IL-1RA is a protein member of the interleukin I cytokine family. It inhibits the activities of interleukin 1 alpha (IL-1α) and of interleukin 1 beta (IL-1β), and modulates a variety of interleukin 1-related immune and inflammatory responses. The IL-1RA gene of a variety of mammal species and correponding IL-1RA protein have been sequenced and are known in the art. In embodiments of the present invention concerning a human subject, the term "IL-1RA" refers to the human IL1RN gene that is located on the large (q) arm of chromosome 2 at position 14.1 (Gene ID: 3557) and that encodes the human protein, IL-1RA. Four alternative spliced transcript variants encoding distinct isoforms have been reported. The reported mRNA sequences of the human IL1RN gene are given by Accession Numbers RefSeq (mRNA): NM_000577.4, NM_173841.2, NM_173842.2, and NM_173843.2, and the corresponding protein sequences are given by Accession Numbers RefSeq(protein): NP_000568.1, NP_776213.1, NP_776214.1, and NP 776215.1.

Interferon-gamma (IFN-γ) is a dimerized soluble cytokine that is the only member of the type II class of interferons. IFN-γ is secreted by T helper cells, cytotoxic cells, macrophages, mucosal epithelial cells and natural killer cells. It is known to be critical for innate and adaptive immunity against viral, some bacterial and protozoal infections: to be an important activator of macrophages and inducer of Class II major histocompatibility complex (MHC) molecule expression: and to exhibit anti-tumor properties. The IFN-γ gene of a variety of mammal species and correponding IFN-γ protein have been sequenced and are known in the art. In embodiments of the present invention concerning a human subject, the term "IFN-γ" refers to the human IFNG gene that is located on the large (q) arm of chromosome 12 at position 15 (Gene ID: 3458) and that encodes the human protein, IFN-γ. The mRNA sequence of IFN-γ is given by Accession Number RefSeq(mRNA): NM_000619, and the corresponding protein sequence is given by Accession Number RefSeq(protein): NP_000610.

Granulocyte-macrophage colony-stimulating factor (GM-CSF), also known as colony stimulating factor 2 (CSF2), is a monomeric glycoprotein that functions as a cytokine and that is secreted by macrophages, T-cells, mast cells, natural killer cells, endothelial cells and fibroblasts. GM-CSF stimulates stem cells to produce granulocytes (neutrophils, eosinophils, and basophils) and macrophages. GM-CSF also has some effects on mature cells of the immune system, including for example, recruiting neutrophil migration and causing some tissue alteration. The GM-CSF gene of a variety of mammal species and correponding GM-CSF protein have been sequenced and are known in the art. In embodiments of the present invention concerning a human subject, the term "GM-CSF" refers to the human CSF2 gene that is located on the large (q) arm of chromosome 5 at position 31 (Gene ID: 1437) and that encodes the human protein, GM-CSF. The mRNA sequence of the human CSF2 gene is given by Accession Number RefSeq(mRNA): NM_000758, and the corresponding protein sequence is given by Accession Number RefSeq(protein): NP_000749.

B. Detection and Quantification of the IL-1RA, IFN-γ and GM-CSF Biomarkers

The methods of diagnostic the present invention comprise a step of determining the expression level of at least one of the biomarkers IL-1RA, IFN-γ and GM-CSF, or of a combination thereof, in a biological sample obtained from the subject to be tested.

1. Biological Samples

As used herein, the term "*subject*" refers to a human or another mammal (e.g., primate, dog, cat, goat, horse, pig, mouse, rat, rabbit, and the like) that can develop a chronic pathology (such as Lyme disease), but may or may not have the pathology. In certain preferred embodiments of the present invention, the subject to be tested is a human being. In such embodiments, the subject is often referred to as an "*individual*" or a "*patient*". The terms "subject", "individual" and "patient" do not denote a particular age, and thus encompass foetuses, newborns, children, teenagers, and adults. In the context of the present invention, the term "patient" more specifically refers to an individual suffering from a chronic pathology.

The term "*biological sample*" is used herein in its broades sense. A biological sample may be any biological tissue or fluid allowing a biomarker of the present invention (e.g., IL-1RA, IFN-γ and/or GM-CSF) to be assayed. Examples of biological samples include, but are not limited to, blood samples (e.g., whole blood or serum), urine, cerebrospinal fluid, saliva, articular and synovial fluids, and bronchoalveolar lavage fluid. The term "biological sample" also encompasses any material derived by processing a biological sample obtained from a subject to be tested. Derived materials include, but are not limited to, cells (or their progeny) isolated from the sample, as well as proteins or nucleic acid molecules (e.g., mRNA) extracted from the sample. Processing of a biological sample may involve one or more of: extraction, filtration, distillation, concentration, inactivation of interfering components, addition of reagents, cell isolation, culture and/or stimulation, and the like.

The methods described herein may be applied to the testing of any biological sample, obtained from a subject to be tested, allowing IL-1RA, IFN-γ and/or GM-CSF to be assayed at the mRNA level or the protein level.

In certain embodiments of the present invention, the biological sample is a blood sample obtained from the subject to be tested. The blood sample may be a sample of whole blood, of purified blood subpopulations, or of serum.

In certain embodiments, the methods of diagnosis of the present invention are performed on the biological sample without any prior major manipulation of the blood sample.

In other embodiments, the methods of diagnosis of the present invention are performed after some components of the blood sample have been isolated (e.g., peripheral blood mononuclear cells) or extracted from said blood sample (e.g., protein extracts or nucleic acid extracts).

Thus, for example, the methods of diagnosis of the present invention may be performed after peripheral blood mononuclear cells (PBMCs) have been separated from the blood sample, and stimulated by contact on plastic or using anti-CD3/anti-CD28 antibodies (see Examples section below). Methods for separating PBMCs from blood samples are known in the art and include, but are not limited to, the use of Ficoll-Paque and centrifugation. The terms "*peripheral blood mononuclear cells*" and "*PBMCs*" are used herein interchangeably. They refer to blood cells having a round nucleus. They correspond to the populations of immune cells that remain at the less dense, upper interface of the Ficoll layer, often refered to as the buffy coat, and are the cells collected when the Ficoll fractionation method is used. PBMCs include lymphocytes (T cells, B cells, and NK cells), monocytes, and dendritic cells. Stimulation of PBMCs or of a subset of PBMCs induces the secretion, in the culture medium, of immune molecules (including citokines), that can then be assayed.

In yet other embodiments, the methods of diagnosis of the present invention are performed after nucleic acid extracts or protein extracts prepared from the blood sample, optionally after peripheral blood mononuclear cells (PBMCs) have been separated from the blood sample, and/or stimulated (see Examples section below).

When the expression level of IL-1RA, IFN-γ and/or GM-CSF is to be determined at the mRNA level, RNA may be extracted from the biological sample or from the isolated PBMCs or a PBMCs subset. Methods of RNA extraction are well known in the art (see, for example, J. Sambrook et al., "*Molecular Cloning: A Laboratory Manual*", 1989, $2^{nd}$ Ed., Cold Spring Harbour Laboratory Press: New York). Most methods of RNA isolation from bodily fluids or tissues are based on the disruption of the tissue in the presence of protein denaturants to quickly and effectively inactivate RNases. RNA isolation reagents comprise, but are not limited to, guanidium thiocyanate and/or beta-mercaptoethanol, which are known to act as RNase inhibitors. Isolated total RNA may then be further purified from the protein contaminants and concentrated by selective ethanol precipitations, phenol/chloroform extractions followed by isopropanol precipitation (see, for example, P. Chomczynski and N. Sacchi, Anal. Biochem., 1987, 162: 156-159) or cesium chloride, lithium chloride or cesium trifluoroacetate gradient centrifugations. Numerous versatile kits that can be used to extract RNA (i.e., total RNA or mRNA) from human bodily fluids or tissues, are commercially available from, for example, Ambion, Inc. (Austin, TX), Amersham Biosciences (Piscataway, NJ), BD Biosciences Clontech (Palo Alto, CA), BioRad Laboratories (Hercules, CA), GIBCO BRL (Gaithersburg, MD), and Giagen, Inc. (Valencia, CA). User Guides that describe in great detail the protocol to be followed are usually included in all these kits. Sensitivity, processing time and cost may be different from one kit to another. One of ordinary skill in the art can easily select the kit(s) most appropriate for a particular situation. In certain embodiments, after extraction, mRNA is amplified, and transcribed into cDNA, which can then serve as template for multiple rounds of transcription by the appropriate RNA polymerase. Amplification methods are well known in the art (see, for example, A. R. Kimmel and S. L. Berger, Methods Enzymol. 1987, 152: 307-316; J. Sambrook et al., "*Molecular Cloning: A Laboratory Manual*", 1989, $2^{nd}$ Ed., Cold Spring Harbour Laboratory Press: New York: "*Short Protocols in Molecular Biology*", F. M. Ausubel (Ed.), 2002, $5^{th}$ Ed., John Wiley & Sons). Reverse transcription reactions may be carried out using non-specific primers, such as an anchored oligo-dT primer, or random sequence primers, or using a target-specific primer complementary to the RNA being monitored, or using thermostable DNA polymerases (such as avian myeloblastosis virus reverse transcriptase or Moloney murine leukemia virus reverse transcriptase).

When the expression level of IL-1RA, IFN-γ and/or GM-CSF is to be determined at the protein level, the method of diagnosis may be performed using a protein extract from the biological sample or from the isolated PBMCs or a PBMCs subset. Preferably, the protein extract contains the total protein content. Methods of protein extraction are well known in the art (see, for example "Protein Methods", Bollag et al., $2^{nd}$ Ed., 1996, Wiley-Liss: "Protein Purification Methods: A Practical Approach", Harris and Angal (Eds.), 1989: "Protein Purification Techniques: A Practical Approach", Roe, $2^{nd}$ Ed., 2001, Oxford University Press: "Principles and Reactions of Protein Extraction. Purification. and Characterization", Ahmed, 2005, CRC Press: Boca Raton, FL). Different kits, that can be used to extract proteins from bodily fluids and tissues, are commercially available from, for example, BioRad Laboratories (Hercules, CA), BD Biosciences Clontech (Mountain View, CA), Chemicon International, Inc. (Temecula, CA), Calbiochem (San Diego, CA), Pierce Biotechnology (Rockford, IL), and Invitrogen Corp. (Carlsbad, CA). One of ordinary skill in the art can easily select the kit(s) most appropriate for a particular situation. After the protein extract has been obtained, the protein concentration of the extract is preferably standardized to a value being the same as that of the control sample in order to allow signals of the protein markers to be quantified. Such standardization can be performed using photometric or spectrometric methods or gel electrophoresis.

2. Determination of IL-1RA, IFN-γ or GM-CSF Expression Levels

Methods for determining the level of expression of a gene, at either the mRNA or protein level, are well known in the art and include, but are not limited to, immunoblots (Western blots), Northern blots, Southern blots, enzyme linked immunosorbent assay (ELISA), immunoprecipitation, immunofluorescence, flow cytometry, immunohisto-chemistry, mass spectrometry, nucleic acid hybridization techniques, nucleic acid reverse transcription methods, nucleic acid amplification methods, and probe arrays. Since the biomarkers to be assayed in a method of diagnosis of the present invention are cytokines (IL-1RA and IFN-γ) or cytokine-like molecule (GM-CSF), other techniques that can be used to determine their expression levels include ELISPOT (enzyme-like immunospot), Fluorospot, and Cytokine Bead Arrays (CBA). Any of these methods, or any combination thereof, may be used in the context of the present invention.

a. Contacting Biological Samples with a Reagent that Specifically Reacts with IL-1RA, IFN-γ or GM-CSF. Generally, determining the expression level of IL-1RA, IFN-γ or GM-CSF in a biological sample first comprises the step of contacting the biological sample obtained from the subject to be tested, with a reagent that specifically reacts with IL-1RA, IFN-γ or GM-CSF.

As used herein, the term "*contacting a biological sample with a reagent that specifically reacts with IL-1RA, IFN-γ or GM-CSF*" typically includes, but is not limited to, mixing or incubating the biological sample with a reagent that specifically reacts with IL-1RA, IFN-γ or GM-CSF. In preferred embodiments, the step of contacting the biological sample is performed for a time and under conditions that allows the reagent to efficiently react with IL-1RA, IFN-γ or GM-CSF.

It is within the abilities of one skilled in the art to determine the optimal conditions allowing (1) the reagent to efficiently react with the biomarker mRNA or protein present in a biological sample and (2) the biomarker mRNA or protein to be detected and quantified. In certain embodiments, the conditions are selected such that a complex forms between the reagent and the biomarker protein present in the biological sample. In other embodiments, the conditions are selected such that the reagent can hybridize to the biomarker mRNA transcripts present in the biological sample, in particular under stringent hybridization conditions. In still other embodiments, the conditions are selected such that the reagent can amplify at least a portion of the biomarker mRNA transcript present in the biological sample.

As used herein, the term "*a reagent that specifically reacts with IL-1RA, IFN-γ or GM-CSF*" refers to any molecule or compound that can be used to detect and determine the expression level of the biomarker IL-1RA, IFN-γ or GM-CSF, in a biological sample. It is within the capabilities of one skilled in the art, using the IL-1RA, IFN-γ or GM-CSF sequence information provided herein or any other IL-1RA, IFN-γ or GM-CSF sequence information available in the art, to develop reagents that specifically react with IL-1RA. IFN-γ or GM-CSF at the mRNA level or at the protein level. Similarly, one skilled in the art knows how to develop reagents that specifically react with the IL-1RA, IFN-γ or GM-CSF of other mammal species, at the mRNA level or at the protein level.

b. Reagents that Specifically React with IL-1RA, IFN-γ or GM-CSF Protein. Examples of suitable reagents that specifically react with IL-1RA, IFN-γ or GM-CSF protein include, but are not limited to, antibodies, antibody molecules or protein-binding peptides that specifically recognize and bind to the IL-1RA, IFN-γ or GM-CSF protein (or a fragment thereof). An entity "*specifically recognizes and/or binds*" to a protein, or a fragment thereof, if it reacts/interacts at a detectable level with the protein but does not react/interact with polypeptides containing unrelated sequences or sequences of different poly peptides.

In certain embodiments, the reagent that specifically reacts with IL-1RA, IFN-γ or GM-CSF protein is an antibody. Suitable antibodies for use in the methods of the present invention include monoclonal and polyclonal antibodies, immunologically active fragments (e.g., Fab or (Fab)$_2$ fragments), antibody heavy chains, humanized antibodies, antibody light chains, and chimeric antibodies. Antibodies, including monoclonal and polyclonal antibodies, fragments and chimeras, may be prepared, and optionally purified, using methods known in the art (see, for example, Mage and Lamoyi, "*Monoclonal Antibody Production Techniques and Applications*", 1987: Goding, "*Monoclonal Antibodies*", $3^{rd}$ Edition, 1996; Minden, "*Monoclonal Antibody Purification*", 1996). Instead of being prepared, antibodies to be used in the methods of the present invention may be obtained from scientific or commercial sources. Anti-IL-1RA antibodies, anti-IFN-γ antibodies and anti-GM-CSF antibodies are commercially available, for example, from Abcam, Santa-Cruz Biotechnology, AbD Serotec, ThermoFisher Scientific, Antibodies-online, LSBio, ABGENT, GeneTex, Sigma-Aldrich, Pierce Antibodies Products, OriGene, BioCompare, and Alomone Labs.

In certain embodiments, the reagent that specifically reacts with IL-1RA, IFN-γ or GM-CSF protein, or a fragment thereof, is a IL-1RA-, IFN-γ- or GM-CSF-binding peptide. Protein-binding peptides and methods for designing or identifying protein-binding peptides are known in the art (see, for example, Zhang et al., Nature Biotechnology, 2000, 18: 71-74; Sood et al., J. Mol. Biol., 2006, 357(3): 917-921: London et al., Structure, 2010, 18(2): 188-199; Sammond et al., J. Am. Chem. Soc., 2011, 133(12): 4190-4192). Protein-binding peptides generally contain between 9 and 35 amino acid residues, for example, between 9 and 13, between 10 and 15, between 15 and 20, between 18 and 25, between 24 and 30, between 27 and 35 or between 32 and 36 amino acids. They may be coupled to other sequences and/or moieties.

In certain embodiments, the reagent that specifically reacts with the IL-1RA, IFN-γ or GM-CSF protein is labeled with a detectable moiety. The terms "*labeled*", "*labeled with a detectable agent*" and "*labeled with a detectable moiety*" are used herein interchangeably. These terms are used to specify that an entity (e.g., an antibody or a protein-binding peptide) can be visualized, for example, following binding to another entity (e.g., a protein biomarker). Preferably, a detectable agent or moiety is selected such that it generates a signal which can be measured and whose intensity is related (preferably proportional) to the amount of protein biomarker present in the sample analyzed. In array-based methods, a detectable agent or moiety is also preferably selected such that it generates a localized signal, thereby allowing spatial resolution of the signal from each spot on the array. A label or detectable moiety may be directly or indirectly detectable by spectroscopic, photochemical, cytometrical, biochemical, immunochemical, electrical, optical, chemical means, by mass spectrometry, or any other suitable means.

Any of a wide variety of detectable agents or moieties can be used in the practice of the present invention. Suitable detectable agents include, but are not limited to: various ligands, radionuclides, fluorescent dyes, chemiluminescent agents, microparticles (such as, for example, quantum dots, nanocrystals, phosphors, and the like), enzymes (such as, for example, those used in an ELISA, i.e., horseradish peroxidase, beta-galactosidase, luciferase, alkaline phosphatase), colorimetric labels, magnetic labels, and biotin, dioxigenin or other haptens, and proteins for which antisera or monoclonal antibodies are available.

As indicated above, the label or detectable moiety may be directly detectable or indirectly detectable. The term "*directly detectable*", when used herein in reference to a label or detectable moiety, means that the label or detectable moiety does not require further reaction or manipulation to be detectable. For example, a fluorescent moiety is directly detectable by fluorescence spectroscopy methods. The term "*indirectly detectable*", when used herein in reference to a label or detectable moiety, means that the label or detectable moiety becomes detectable after further reaction or manipulation. For example, a hapten becomes detectable after reaction with an appropriate antibody attached to a reporter, such as a fluorescent dye.

Methods for labeling biological molecules such as polypeptides and antibodies are well-known in the art (see, for example, "*Affinity Techniques. Enzyme Purification: Part B*", Methods in Enzymol., 1974, Vol. 34, Jakoby and Wilneck (Eds.), Academic Press: New York, NY: and M. Wilchek and E. A. Bayer, Anal. Biochem., 1988, 171: 1-32).

In certain embodiments, the reagent (e.g., an anti-IL-1RA antibody, an anti-IFN-γ antibody, an anti-GM-CSF antibody, a IL-1RA-binding peptide, an IFN-γ-binding peptide or a GM-CSF-binding peptide) may be immobilized on a carrier or solid support (e.g., a bead, a magnetic particle, a latex particle, a microtiter plate well, a cuvette, or other reaction vessel). Examples of suitable carrier or support materials include agarose, cellulose, nitrocellulose, dextran, Sephadex, Sepharose, liposomes, carboxymethyl cellulose, polyacrylamydes, polystyrene, gabbros, filter paper, magnetite, ion-exchange resin, plastic film, plastic tube, glass, polyamine-methyl vinyl-ether-maleic acid copolymer, amino acid copolymer ethylene-maleic acid copolymer, nylon, silk, and the like. Such a reagent may be indirectly immobilized using a secondary binding agent specific for the first binding agent (e.g., a mouse antibody specific for a protein biomarker may be immobilized using an sheep anti-mouse IgG Fc fragment specific antibody coated on the carrier or support). The secondary binding agent may be coupled to a detectable tag, such as for example, an enzyme, fluorophore, or chromophore.

ELISPOT. As will be recognized by one skilled in the art, the step of determining the expression level of IL-1RA, IFN-γ or GM-CSF, at the protein level, may be performed using an ELISPOT (enzyme-linked immunospot) assay (Czerkinsky et al., J: Immunol. Methods, 1983, 65: 109-121) or FluoroSpot assay. The ELISPOT assay is a widely used method for monitoring cellular immune-responses in humans or other mammals. Briefly, under appropriate conditions, the ELISPOT assay allows visualization of the secretory product(s) of individual activated or responding cells. Each spot that develops in the assay represents a single reactive cell. Thus, the ELISPOT assay provides both qualitative (regarding the specific cytokine or other secreted immune molecule) and quantitative (the frequency of responding cells within the test population) information. In an ELISPOT assay, the membrane surfaces of a multi-well PVDF-membrane microtiter are coated with a capture antibody that binds a specific epitope of the cytokine or other secreted immune molecule being assayed. During the cell incubation and stimulation step, peripheral blood mononuclear cells (PBMCs) are seeded into the wells of the plate along with the antigen, and form a monolayer on the membrane surface of the well. As the antigen-specific cells are activated, they release the cytokine, which is captured directly on the membrane surface with the immobilized antibody. The cytokine (or other cell product of interest) is thus "captured" in the area directly surrounding the secreted cell, before it has a chance to diffuse into the culture medium, or to be degraded by proteases and bound by receptors on bystander cells. Subsequant detection steps visualize the immobilized cytokine (or another secreted immune molecule of interest) on ImmunoSpot, essentially the secretory footprint of the activated cell. The FluoroSpot assay is a modification of the ELISPOT assay and is based on using multiple fluorescent-labeled anti-cytokine antibodies, which makes it possible to measure multiple cytokines in the same assay.

c. Reagents that Specifically React with IL-1RA, IFN-γ or GM-CSF mRNA Transcripts. Examples of suitable reagents that specifically react with IL-1RA, IFN-γ or GM-CSF mRNA transcripts include, but are not limited to, nucleic acid probes that specifically hybridize to IL-1RA, IFN-γ or GM-CSF mRNA transcripts, and primers that specifically amplify at least a portion of IL-1RA, IFN-γ or GM-CSF mRNA transcripts to produce amplicons that can then be detected and quantified. As used herein, the term "*specifically hybridizes*" means that cross-hybridization with mRNA transcripts other than the biomarker mRNA transcript is not significantly produced under ordinary hybridization conditions, preferably under stringent hybridization conditions (see, for example, the conditions disclosed in Sambrook et al., "*Molecular Cloning: A Laboratory Manual*", 2012, 4$^{th}$ Ed., Cold Spring Harbor Press: Plainview, NY: Ausubel, "*Current Protocols in Molecular*

*Biology"*, 1994, John Wiley & Sons: Secaucus, NJ). As used herein, the term "*specifically amplifies* " means that cross-annealing with mRNA transcripts other than the biomarker mRNA transcript and subsequent extension are not significantly produced under ordinary amplification conditions (see, for example, the conditions disclosed in Sambrook et al., "*Molecular Cloning: A Laboratory Manual"*, 2012, 4th Ed., Cold Spring Harbor Press: Plainview, NY: Ausubel, "*Current Protocols in Molecular Biology"*, 1994, John Wiley & Sons: Secaucus, NJ).

The primers and probes useful in the practice of the present invention may be oligonucleotides comprising between about 5 and about 150 nucleotides. The terms "*approximately* " and "*about* ", as used herein in reference to a number, generally include numbers that fall within a range of 10% in either direction of the number (greater than or less than the number) unless otherwise stated or otherwise evident from the context (except where such number would exceed 100% of a possible value).

When the oligonucleotide is used as a primer, its length is usually about 15 to about 100 nucleotides, preferably about 17 to about 30 nucleotides. However, the length of the primer is not particularly limited as long as it is capable of amplifying at least a portion of a IL-1RA, IFN-γ or GM-CSF mRNA transcript. In certain embodiments, a reagent according to the present invention is a pair of primers comprising: a 5' (upstream) primer (or forward primer) that hybridizes with the 5' end of the nucleic acid sequence to be amplified and a 3' (downstream) primer (or reverse primer) that hybridizes with the complement of the sequence to be amplified. Such primer pairs are particularly useful in PCR amplification reactions.

These primer pairs can be used according to any nucleic acid amplification technique that employs two or more oligonucleotides to amplify a target sequence. Amplification products generated using a primer pair may be detected using any of a variety of detection methods well known in the art. For example, amplification products may be detected using agarose gel electrophoresis and visualization by ethidium bromide staining and exposure to ultraviolet (UV) light or by sequence analysis of the amplification product, or any other method known in the art.

When the oligonucleotide is used as a probe, its length is usually about 5 to about 200 nucleotides, preferably about 7 to about 100 nucleotides, more preferably about 7 to about 50 nucleotides. The length of the probe is not particularly limited as long as it is capable of specifically hybridizing to a portion of a IL-1RA, IFN-γ or GM-CSF mRNA transcript. From the sequence information provided above, one skilled in the art knows how to design and prepare suitable probes. Generally, probes have a complimentary nucleic acid sequence that selectively hybridizes to the target nucleic acid sequence. In order for a probe to hybridize to a target sequence, the hybridization probe must have sufficient identity with the target sequence, i.e., at least 70% (e.g., 80%, 90%, 95%, 98% or more) identity to the target sequence. The probe sequence must also be sufficiently long so that the probe exhibits selectivity for the target sequence over non-target sequences.

An oligonucleotide useful in the practice of the present invention (primer or probe) may include one or more sequences which can serve as spacers, linkers, sequences for labeling or binding to an enzyme, which may impart added stability or susceptibility to degradation process or other desirable property to the oligonucleotide. The primers and probes that can be used in the practice of the present invention may be prepared using any of a variety of methods well known in the art (see, for example, Sambrook et al., "*Molecular Cloning: A Laboratory Manual"*, 2012, 4th Ed., Cold Spring Harbour Laboratory Press: New York, NY: "*PCR Protocols: A Guide to Methods and Applications"*, 1990, Innis (Ed.), Academic Press: New York, NY: Tijssen "*Hybridization with Nucleic Acid Probes—Laboratory Techniques in Biochemistry and Molecular Biology* (*Parts I and II*)", 1993, Elsevier Science: "*PCR Strategies"*, 1995, Innis (Ed.), Academic Press: New York, NY: and "*Short Protocols in Molecular Biology"*, 2002, Ausubel (Ed.), 5th Ed., John Wiley & Sons: Secaucus, NJ).

In certain embodiments, the probe or one or both of the primers used in the method of diagnosis of the present invention is/are labeled with a detectable agent or moiety Any of a wide variety of detectable agents can be used in the practice of the present invention. Suitable detectable agents include, but are not limited to, various ligands, radionuclides: directly or indirectly detectable fluorescent dyes: chemiluminescent agents: spectrally resolvable inorganic fluorescent semiconductor nanocrystals (i.e., quantum dots), metal nanoparticles (e.g., gold, silver, copper and platinum) or nanoclusters: enzymes (such as, for example, those used in an ELISA, i.e., horseradish peroxidase, beta-galactosidase, luciferase, alkaline phosphatase): colorimetric labels (such as, for example, dyes, colloidal gold, and the like): magnetic labels (such as, for example, Dynabeads™): and biotin, dioxigenin or other haptens and proteins for antisera or monoclonal antibodies are available.

Methods for labeling nucleic acid molecules (such as oligonucleotide probes or primers) are well-known in the art. For a review of labeling protocols and label detection techniques, see, for example, Kricka, Ann. Clin. Biochem. 2002, 39: 114-129; van Gijlswijk et al., Expert Rev. Mol. Diagn. 2001, 1: 81-91: and Joos et al., J. Biotechnol. 1994, 35: 135-153. The selection of a particular nucleic acid labeling technique will depend on the situation and will be governed by several factors, such as the ease and cost of the labeling method, the quality of sample labeling desired, the effects of the detectable moiety on the hybridization reaction (e.g., on the rate and/or efficiency of the hybridization process), the nature of the amplification method used, the nature of the detection system, the nature and intensity of the signal generated by the detectable label, and the like.

In certain embodiments, a detection probe is immobilized on a solid support. For example, the solid support may be a bead, a particle, a microplate well, an array, a cuvette, a tube, a membrane, a gel, a resin, and the like. A probe is immobilized by being either covalently or non-covalently bound to the surface of a solid carrier or support. In the practice of the present invention, the solid support may be any solid support known in the art, to which the probe can be operably affixed. "*Operably affixed* " refers to the probe being affixed in a manner permitting the formation of a complex between the affixed probe and the amplicons (or the target sequence) present in the biological sample tested. Methods for immobilizing oligonucleotides to a solid support and for generating arrays are known in the art.

3. Expression Levels of IL-1RA, IFN-γ or GM-CSF

Once the expression level of IL-1RA, IFN-γ or GM-CSF has been determined, as described herein, in the biological sample obtained from a subject to be tested, it may be compared with the expression level of IL-1RA, IFN-γ or GM-CSF determined in a biological sample obtained from a healthy subject and/or with the expression level of IL-1RA, IFN-γ or GM-CSF determined in one or more control or reference samples and/or with a predetermined threshold. In other embodiments, a ratio between the expression levels of two of the biomarkers IL-1RA, IFN-γ and GM-CSF determined in the biological sample obtained from he subject to be tested (e.g., the ratio [IL-1RA]/[IFN-γ] between the expression level of IL-1RA and the expression level of IFN-γ, or the ratio [IL-1RA]/[GM-CSF] between the expression level of IL-1RA and the expression level of GM-CSF) is first calculated and then compared with the same ratio determined using a biological sample obtained from a healthy subject or with the same ratio determined in one or more control or reference samples and/or with a predetermined threshold ratio.

As known in the art, comparison of expression levels is preferably performed after the expression levels measured have been corrected for both differences in the amount of sample assayed and variability in the quality of the sample used (e.g., volume of sample, amount of protein extracted or number of cells used, or amount and quality of mRNA tested, etc. . . . ). Correction may be carried out using any suitable method well-known in the art. For example, the protein concentration of a sample may be standardized using photometric or spectrometric methods or gel electrophoresis or via cell counting before the sample is analyzed. For analyses performed on nucleic acid molecules, correction may be carried out by normalizing the levels against reference genes (e.g., housekeeping genes such as, for example, the B2M (β-2-microglobulin) gene and the HPRT1 (hypoxanthine phosphoribosyltransferase) gene) in the same sample.

In certain embodiments, the result obtained for the biological sample of the subject to be tested is compared with the result obtained for a biological sample of a healty subject. The terms "*healthy*" and "*normal*" are used herein interchangeably. When used to characterize a subject, they refer to a subject that is healthy, and in particular to a subject that does not suffer from a chronic pathology, or an infection. Preferably, a healthy subject is not on medication that may affect the quantification of IL-1RA, IFN-γ or GM-CSF. In certain embodiments, normal/healthy subjects have the same age, sex, and/or body mass index as compared to the subject from which the biological sample to be tested was obtained. The terms "healthy" and "normal" are also used herein to qualify a biological sample obtained from a healthy subject (or from a cohort of heathy subjects).

In certain embodiments, the result obtained for the biological sample of the subject to be tested is compared with the result obtained for at least one biological sample of a control subject. In the context of the present invention, the term "*control*", when used herein to characterize a subject, refers to a patient who has been diagnosed with a specific chronic pathology (for example Lyme disease), or to a patient who has been diagnosed with a specific phase of a chronic pathology (for example, primary phase of Lyme disease, secondary phase of Lyme disease, or late chronic form of Lyme disease). The term "*control sample*" refers to a sample that has been obtained from a control subject or from a cohort of control subjects.

As will be recognized by one skilled in the art, results obtained by studying a cohort of healthy subjects and/or a cohort of control patients, may be used to determine values (of the expression levels of IL-1RA, IFN-γ and/or GM-CSF or of the ratio between the expression levels of two of the three IL-1RA, IFN-γ and GM-CSF biomarkers), which are indicative of a chronic pathology or of a given stage of a chronic pathology. Thus, in certain embodiments, in a diagnostic method according to the present invention, the result obtained for the subject to be tested is compared with at least one predetermined threshold or predetermined threshold ratio. As used herein, the terms "*predetermined threshold*" and "*predetermined threshold ratio*" refer to a value and a ratio, respectively, that have been determined using a cohort of healthy subjects or a cohort of control patients and that are indicative (i.e., "diagnostic") of a chronic pathology or of a phase of a chronic pathology or of the absence of chronic pathology.

Thus, for example in the case of Lyme disease, the expression level of IL-1RA determined in a biological sample obtained from a subject to be tested may be compared with a first threshold, $[IL-1RA]_1$, determined in a cohort of healthy subjects, and/or to a second threshold, $[IL-1RA]_2$, determined in a cohort of patients with a confirmed diagnosis of Lyme disease, and/or with a third threshold, $[IL-1RA]_3$, determined in a cohort of patients with a confirmed diagnosis of late chronic form of Lyme disease. The same may be performed using the expression level of IFN-γ and/or GM-CSF. Alternatively, the ratio [IL-1RA]/[IFN-γ] determined in a biological sample obtained from a subject to be tested may be compared with a first threshold ratio, $[IL-1RA]/[IFN-\gamma]_1$, determined in a cohort of healthy subjects, and/or to a second threshold ratio, $[IL-1RA]/[IFN-\gamma]_2$, determined for a cohort of patients with a confirmed diagnosis of Lyme disease, and/or with a third threshold ratio, $[IL-1RA]/[IFN-\gamma]_3$, determined for a cohort of patients with a confirmed diagnosis of late chronic form of Lyme disease. The same may be performed using the ratio [IL-1RA]/[GM-CSF].

Depending on the chronic pathology, one skilled in the art knows how to select the controls and comparisons to be performed in order to reach a diagnosis.

C. Diagnosis of a Chronic Pathology using the Expression Levels of IL-1RA, IFN-γ and/or GM-CSF Diagnosis of Lyme Disease As already mentioned above, there is currently no reliable diagnostic tool for the diagnosis of the late chronic form of Lyme disease. To the Inventors' knowledge, it is the first time that a quantifiable and reliable biological signature of the late chronic form of Lyme disease is reported.

More specifically, the present Inventors have found that, at the mRNA level as well as at the protein level, the expression level of IL-1RA in a biological sample obtained from a patient with late chronic form of Lyme disease is higher than the expression level of IL-1RA in a biological sample obtained from a healthy patient. Thus, an expression level of IL-1RA determined for the subject to be tested that is higher than the expression level of IL-1RA determined for a healthy subject is indicative of the late chronic form of Lyme disease. The present Inventors have also found that, at the mRNA level as well as at the protein level, the expression levels of IFN-γ and of GM-CSF in a biological sample obtained from a patient with late chronic form of Lyme disease is lower than the corresponding expression levels in a biological sample obtained from a healthy patient. Thus, an expression level of IFN-γ or of GM-CSF determined for the subject to be tested that is higher than the expression level of IFN-γ or of GM-CSF determined for a healthy subject is indicative of the late chronic form of Lyme disease.

The present Inventors have also found that the ratio [IL-1RA]/[IFN-γ] determined in a biological sample obtained from a patient with late chronic form of Lyme disease is higher than the ratio [IL-1RA]/[IFN-γ] determined in a biological sample obtained from a healthy patient. Thus, a ratio [IL-1RA]/[IFN-γ] determined for the subject to be tested that is higher than the ratio [IL-1RA]/[IFN-γ] determined for a healthy subject is indicative of the late chronic form of Lyme disease. The present Inventors have further found that the ratio [IL-1RA]/[GM-CSF] determined in a biological sample obtained from a patient with late chronic form of Lyme disease is higher than the ratio [IL-1RA]/[GM-CSF] determined in a biological sample obtained from a healthy patient. Thus, a ratio [IL-1RA]/[GM-CSF] determined for the subject to be tested that is higher than the ratio [IL-1RA]/[GM-CSF] determined for a healthy subject is indicative of the late chronic form of Lyme disease.

As used herein, by the terms "*increase*" or "*higher*" refer to an increase (or augmentation) of at least 5%, at least about 10%, at least about 20%, at least 25%, at least 30%, at least 40%, at least about 50%, at least about 75%, at least about 80%, at least about 100%, at least about 200% (i.e., 2-fold), or at least about 500% (i.e., 5-fold), or at least about 10,000% (i.e., 10-fold) or more over the level of expression under control conditions. As used herein, by the terms "*decrease*" or "*lower*" refer to a decrease (or reduction) of at least 5%, at least about 10%, at least about 25%, at least about 50%, at least about 75%, at least about 80%, at least about 90% or less of the level of expression under control conditions.

The ratio [IL-1RA]/[IFN-γ] was also found to be indicative of the severity of the late chronic form of Lyme disease, increasing with increasing severity of the disease.

Using diagnostic methods described herein, skilled physicians may, based on the diagnosis reached, select and prescribe treatments adapted to each patient. Selection of an appropriate therapeutic regimen for a given patient may be made based solely on the diagnosis provided by the inventive diagnostic method. Alternatively, the physician may also consider other clinical or pathological parameters used currently used to diagnose Lyme disease, in particular the late chronic form of Lyme disease.

Diagnosis of Other Chronic Pathologies

Connections or associations between bacterial and viral infectious agents and subsequent development of chronic disease have been suggested in the past but are currently being reexamined with more rigor and specificity (Carter et al., Ann. Med., 2012, 44: 784-792: O'Connor et al., Emerg. Infect. Dis., 2006, 12: 1051-1057: Nicolson et al., J. Neurosci. Res., 2007, 85: 1143-1148: Orrskog et al., PLOS One, 2013, 8: e68861: Semenza et al., Clin. Microbiol. Infect., 2013, 19: 814-821: Gargano et al., Annu. Rev. Public Health, 2014, 35: 65-82: Allen et al., J. Neuroinfect. Disease, 2016, 7: 200, Itzhaki et al., J. Alzheimer's Dis., 2016, 51: 979-984: Mercer, "Infections, Chronic Disease, and the Epidemiological Transition: A New Perspective", NY: University of Rochester Press, 2014: Romagnolia et al., PNAS, 2016, 113: 8502-8507; Feldman et al., Nature Medicine, 2015, 21(7): 730-738: Winslow, et al., Cell Immunol., 2017, 1: 30114-4: Stephen-Victor et al., Cell Microbiol. 2017, 19(6): 12746; Ahlers et al., Curr. Clin. Microbiol. Rep., 2016, 3(3): 132-141; Cadwell et al., Nat. Rev. Immunol., 2016, 16(11): 661-675: Jeltsch-David et al., J. Autoimmun., 2016, 74: 13-26; Coit et al., Clin. Immunol., 2016, 170: 70-79: Eberl, Nat. Rev. Immunol., 2016, 16(8): 524-532: Pelka et al., Immunol Rev. 2016 January: 269(1):60-75: Massilamany et al., Curr. Opin. Virol., 2016, 16: 8-14; Gianchecchi et al., Autoimmun. Rev., 2015, 14(11): 971-983: Smith et al. PLOS One, 2012, 7(1): e30273. doi: 10.1371/journal.pone.0030273: Sherwin, Ann. NY Acad. Sci., 2017, doi: 10.1111/nyas.13416; Yoshimoto S et al., Nature, 2017, 499: 97-101). Furthermore, over the past two decades, changes in immune system activity have been identified as a hallmark feature of many chronic diseases (Rubinow et al., Dialogues Clin. Neurosci., 2017, 19: 19-26).

Thus, since over-expression of IL-1RA and under-expression of IFN-γ and GM-CSF, evidenced by the present Inventors, are the reflection of a partially deficient, or inhibited, immune response in patients suffering from the late chronic form of Lyme disease, it is proposed to generalize the application of the diagnostic methods described herein to other chronic diseases. Consequently, in certain embodiments, the methods of the present invention, and in particular the expression levels of IL-1RA, IFN-γ and/or GM-CSF, or their ratios, are used for the diagnosis of a chronic pathology (other than Lyme disease). The terms "*chronic pathology*", "*chronic disease*", "*chronic disorder*", "chronic illness" and "chronic condition" are used herein interchangeably. They refer to a health condition that is persistent or otherwise long-lasting in its effects or to a health condition that develops over time. A chronic pathology may affect any of a variety of organs and/or systems of the body. In certain embodiments, the terms more specifically refer to a chronic health condition that is associated with an infectious agent. The term "*associated with an infectious agent*", when used herein to characterize a chronic pathology, refers to a chronic health condition with an infectious etiology, either as a cause or a cofactor, or to a chronic health condition that is known to be commonly accompanied with bacterial, parasital and/or viral infection(s).

In certain embodiments, the chronic pathology to be diagnosed with a method according to the present invention is an autoimmune disease with an unknown etiology, including, but not limited to, multiple sclerosis, amyotrophic lateral sclerosis, systemic lupus erythematous, vasculitis, Kawasaki disease, uveitis, Dressler syndrome, myasthenia gravis, scleroderma, Gougerot-Sjögren syndrome, diabetes mellitus, celiac disease, and autoimmune thyroiditis.

In other embodiments, the chronic pathology is an inflammatory disease, including, but not limited to, psoriasis, inflammatory bowel disease (Crohn's Disease and ulcerative colitis), rheumatoid arthritis, ankylosing spondylitis, osteoarthritis, atherosclerosis, vasculitis, Horton vasculitis, and myasthenia gravis.

In still other embodiments the chronic pathology is a neurodegenerative disease, including, but not limited to, Parkinson's disease, Alzheimer's disease, multiple sclerosis, amyotrophic lateral sclerosis, spinocerebellar ataxia, multi-systematic atrophy, Alexander's Disease, progressive supranuclear palsy, and myofasciitis with macrophages In yet other embodiments, the chronic pathology is a chronic infection caused by slow growing pathogens, including, but are not limited to, tuberculosis, leprosy, other mycobacterial infections (e.g., Nontuberculosis mycobacterium infections, and Buruli ulcer), and Whipple's disease (which is caused by *Tropheryma whippelii*).

In other embodiments, the chronic pathology is a behavorial disorder, such as a condition of pervasive developmental disorders (PDD), including autism spectrum disorder (ASD). ASD is the name of a range of similar conditions, including Asperger syndrome, that affect a person's social interaction, communication, interests and behaviour.

In still other embodiments, the chronic pathology is chronic fatigue syndrome, or fibromyalgia.

In other embodiments, the chronic pathology is selected from chronic diseases or conditions associated with infections with bacteria of one or more of the following genuses: *Bordetella, Borrelia, Brucella, Campylobacter, Chlamydia and Clamidophylia, Clostridium, Corynebacterium, Enterococcus, Escherichia, Francisella, Haemophilus, Helico-*

*bacter, Legionella, Leptospira, Listeria, Mycobacterium, Mycoplasma, Neisseria, Pseudomonas, Rickettsia, Salmonella, Shigella, Staphylococcus, Streptococcus, Treponema, Tropheryma, Vibria*, and *Yersinia*. In other or the same embodiments, the chronic pathology is selected from chronic diseases or conditions associated with infections with one or more of the following viruses: *Powassan* virus, tick-borne *encephalitis* virus, the *Flaviviruses, Heartland* virus, the *phleboviruses, Bourbon* virus, the *Orthomyxoviridae* viruses, and the *Herpes* viruses.

Other Uses

A method according to the present invention may also be used for assessing the evolution of the chronic pathology over time. In such embodiments, the method (determination of mRNA or protein expression levels of IL-1RA, IFN-γ and/or GM-CSF or of a ratio of such expression levels) is carried out at two different time points and the results obtained at the two different time points are compared.

A method according to the present invention may also be used for assessing the response of a subject to a treatment. Indeed, in this case, the two different time points mentioned above may correspond to a first time point before administration of the treatment and a second time point after administration of the treatment has started. Comparison of the results obtained at the two time points allows to assess the response of a subject to the treatment, and may help a practioner to adapt the treatment (dosage, administration mode, etc. . . . ) or change the treatment (e.g., different antibiotic agent or different combination of antibiotics or of any other class of therapeutic agents useful in the treatment of the chronic pathology), in view of the subject's response.

A method according to the present invention may also be used for the early identification or early diagnosis of a relapse or flare-up of the chronic disease. Indeed, in this case, the two different time points mentioned above may correspond to a first time point at the end of a treatment and a second (or subsequent) time point post-treatment. Comparison of the results obtained at the two time points allows to identify a change in the biological status of the subject, that is predictive of a relapse.

Veterinary Aspect

One skilled in the art will recognized that, while the present document mainly deals with human diseases, the methods of the present invention are applicable to the diagnosis of chronic pathologies that affect animals (e.g., horse, dogs, cows, cats, etc.). Examples of chronic pathologies that affect animals include, but are not limited to, chronic Lyme disease, and chronic diseases with an unknown or not well understood etiology, including, but not limited to, vasculitis, tick paralysis, ehrlichiosis, osteoarthritis, hypertrophic osteodystrophy, masticatory muscle myositis, meningoencephalitis, uveitis, auto-immune induced hypothyroidism, lupus erythematosus, myasthenia gravis, herpes viruses induced diseases, multinodular pulmonary fibrosis, and myeloencephalitis.

D. Diagnostic Kits

In another aspect, the present invention provides kits comprising materials useful for carrying out a diagnostic method of the invention. The diagnostic procedures described herein may be performed by analytical laboratories, research laboratories and/or practitioners. The invention provides kits that can be used in these different settings.

Materials and reagents for performing a diagnostic method of the present invention may be assembled together in a kit. In certain embodiments, an inventive kit comprises at least one reagent that specifically reacts with the IL-1RA, IFN-γ or GM-CSF biomarker, as described above. Thus, in certain embodiments, a kit comprises at least one reagent that specifically reacts with IL-1RA, IFN-γ or GM-CSF mRNA transcripts and that allows the expression level of the IL-1RA, IFN-γ or GM-CSF gene to be determined at the mRNA level (e.g., a probe or a pair of primers, as described above). In other embodiments, a kit comprises at least one reagent that specifically reacts with the IL-1RA, IFN-γ or GM-CSF protein and that allows the expression level of the IL-1RA, IFN-γ or GM-CSF gene to be determined at the protein level (e.g., an antibody or protein-binding peptide, as described above).

In certain embodiments, an inventive kit comprises two reagents allowing determination of the expression levels of two of the three IL-1RA, IFN-γ and GM-CSF biomarkers, at the protein or mRNA level.

In yet other embodiments, an inventive kit comprises three reagents allowing determination of the expression levels of the three IL-1RA, IFN-γ and GM-CSF biomarkers, at the protein or mRNA level.

In embodiments where the kit is intended to used for the determination of protein expression levels, it may further comprise at least one reagent for the detection of a protein biomarker-antibody complex formed between an antibody included in the kit (i.e., an anti-IL-1RA, IFN-γ or GM-CSF antibody) and the protein biomarker (i.e., IL-1RA, IFN-γ or GM-CSF, respectively) present in a biological sample obtained from a subject. Such a reagent may be, for example, a labeled antibody that specifically recognizes antibodies from the species tested (e.g., an anti-human IgG). If the antibodies are provided attached to the surface of an array, a kit of the invention may comprise only one reagent for the detection of biomarker-antibody complexes (e.g., a fluorescently-labeled anti-human antibody).

Depending on the procedure, the kit may further comprise one or more of: cell culture medium and/or reagent, cell stimulation buffer and/or reagents, extraction buffer and/or reagents, amplification buffer and/or reagents, hybridization buffer and/or reagents, immunodetection buffer and/or reagents, labeling buffer and/or reagents, and detection means. Protocols for using these buffers and reagents to perform different steps of the diagnostic procedure may be included in the kit. Other reagents can be included in separate containers and provided with the kit, e.g., positive control samples or compounds, negative control samples or compounds, buffers, cell culture media, specific detection probes, and the like.

The different reagents may be supplied in a solid (e.g., lyophilized) or liquid form. The kits of the present invention may optionally comprise different containers (e.g., vial, ampoule, test tube, flask or bottle) for each individual buffer and/or reagent. Each component will generally be suitable as aliquoted in its respective container or provided in a concentrated form. Other containers suitable for conducting certain steps of the disclosed methods may also be provided. The individual containers of the kit are preferably maintained in close confinement for commercial sale.

When the kit is intended to be used for the diagnosis of Lyme disease, it may further comprise at least one reagent to detect antibodies (IgG and/or IgM) created in response to a *Borrelia burgdorferi* infection (by ELISA or Western Blot, or by a two-tiered protocol), and/or at least one reagent to detect the presence of genetic material (DNA) of the *Borrelia* bacterium (by PCR) in a biological sample. Generally, selection of *Borrelia* species for extraction of antigens is based on "local" sources and a limited number of species. Kits intended to be used in the USA may typically use antigens from the B31 strain of *Borrelia burgdorferi sensu*

*stricto*, whereas kits intended to be used in Europe usually also include antigens derived from *Borrelia afzelii* and *Borrelia garinii*. Such kits may also comprise reagents to detect or identify other co-infections commonly seen in Lyme disease, namely infections caused by microorganisms of the *Babesia* genus, the *Rickettsia* genus, the *Bartonella* genus, the *Ehrlichia* genus, and the like.

As will be recognized by one skilled in the art, a kit intended to be used for the diagnosis of another chronic pathology may similarly further comprise at least one reagent that is commonly used to diagnosis said chronic pathology and/or known infection associated with said chronic pathology.

A kit according to the present invention may further comprise instructions for using the kit according to a method of the invention. Instructions for using the kit according to a method of the invention may comprise instructions for processing the biological sample obtained from the subject to be tested, and/or instructions for contacting the sample with the reagent that specifically reacts with IL-1RA, IFN-γ or GM-CSF, and/or instructions for labelling primers, and/or probes, and/or instructions for performing the test, and/or instructions for interpreting the results. Optionally associated with the container(s) can be a notice or package insert in the form prescribed by a governmental agency regulating the manufacture, use or sale of pharmaceutical or biological products, which notice reflects approval by the agency of manufacture, use or sale for human administration.

An identifier, e.g., a bar code, radio frequency, ID tags, etc., may be present in or on the kit. The identifier can be used, for example, to uniquely identify the kit for purposes of quality control, inventory control, tracking movement between workstations, etc.

II—Therapeutic Aspect

Since IL-1RA was found to be expressed at very high levels in patients with the late chronic form of Lyme disease, IL-1RA can also be used as a therapeutic target. Thus, the present invention further relates to an IL-1RA therapeutic agent, or a pharmaceutical composition thereof, for use in the treatment of a chronic pathology (as defined above), in particular for the treatment of Lyme disease, notably the late chronic form of Lyme disease. The term "*treatment*" is used herein to characterize a method or process that is aimed at (1) delaying or preventing the onset of a disease or condition (here a chronic pathology): (2) slowing down or stopping the progression, aggravation, or deterioration of the symptoms of the disease or condition: (3) bringing about amelioration of the symptoms of the disease or condition: or (4) curing the disease or condition. A treatment may be administered after initiation of the disease or condition, for a therapeutic action. Alternatively, a treatment may be administered prior to the onset of the disease or condition, for a prophylactic or preventive action. In this case, the term "*prevention*" is used.

A. IL-1RA Therapeutic Agents and Other Therapeutic Agents

As used herein, the term "*IL-1RA therapeutic agent*" refers to a molecule or a compound that interacts or interferes with IL-1RA normal expression and/or activity to produce a therapeutic effect. The therapeutic effect may result from any of a large variety of action mechanisms. Thus, an IL-1RA therapeutic agent may block the activity of IL-1RA: prevent or inhibit IL-1RA induction: inhibit the expression of the IL-1RA gene: destroy, degrade or cleave IL-1RA mRNAs or protein: and/or block IL-1RA mRNA translation. Examples of IL-1RA therapeutic agents include, but are not limited to, IL-1RA antagonists or inhibitors, and antagonists or inhibitors of the Toll-Like Receptor 10 (TLR10), which is known to induce IL-1RA through MAPK-dependent pathways (Oosting et al., PNAS USA, 2014, 111: E4478-E4484).

IL-1RA Antagonists and Inhibitors

IL-1RA antagonists or inhibitors suitable for use in the therapeutic applications of the present invention include, but are not limited to, natural "inhibitors" of IL-1RA, anti-IL-1RA antibodies and anti-IL-1RA polynucleotides.

Since IL-1RA is a potent antagonist of both forms of IL-1, natural "inhibitors" of IL-1RA that can be used in a treatment method according to the present invention are IL-1α and IL-1β. Recombinant forms of human IL-1α and IL-1β have been described (Gubler et al., J. Immunol., 1986, 136: 2492-2497; Block et al., Protein Expr. Purif., 2008, 57: 244-254) and are commercially available from a lot of companies and laboratories such as Abcam, Novoprotein, ThermoFisher, EmdMillipore, Invivogen, and Biorbyt.

Other suitable IL-1RA inhibitors include blocking anti-IL-1RA antibodies, in particular blocking anti-IL-1RA monoclonal antibodies. Antibodies specific for an antigen can be potent inhibitors, in that they impede normal functioning of the protein, at least because of the steric effect. Anti-IL-1RA monoclonal antibodies are commercially available from BioLegnd, Becton Dickinson, Cell Signaling Technology, Thermo Fischer Scientific, Life Span BioScience, Ray Biotech, Abbiotech, Fitzgerald, etc.

Other agents that can be used as IL-1RA inhibitors include antisense polynucleotides and RNA interfering agents. As used herein, the term "*RNA interference*" (or "RNAi") has its art understood meaning and refers to a biological process in which RNA molecules silence, inhibit or down-regulate gene expression by causing the destruction, degradation and/or cleavage of specific mRNA molecules or by blocking the translation thereof. As known in the art, RNA interference is now exploited in therapy. Indeed, RNAi can be initiated by the hand of man, for example, to silence the expression of target genes. The terms "*RNAi agent*" and "*RNA interfering agent*" are used herein interchangeably. They refer to any RNA molecule that is capable of specifically inhibiting or down-regulating the expression of a target gene (here the IL-1RA gene). By "*silencing, inhibiting or down-regulating expression of a target gene*", it is meant that the expression of the target gene, or level of RNA molecules or equivalent RNA molecules encoding one or more proteins or protein subunits, or activity of one or more proteins or protein subunits, is reduced below that observed in the absence of the RNAi agent. An RNAi agent may be any single-stranded RNA (e.g., mature miRNA, ssRNAi oligonucleotides, ssDNAi oligonucleotides) or double-stranded RNA (i.e., duplex RNA such as siRNA, Dicer-substrate dsRNA, shRNA, aiRNA, or pre-miRNA) that is capable of reducing or inhibiting the expression of a target gene or sequence (e.g., by mediating the degradation or inhibiting the translation of mRNAs which are complementary to the interfering RNA sequence), when the RNAi agent is in the same cell as the target gene or sequence. The term "RNAi agent" thus refers to the single-stranded RNA that is complementary to a target mRNA sequence (or circRNA sequence) or to the double-stranded RNA formed by two complementary strands or by a single, self-complementary strand. An RNAi agent may have substantial or complete identity to the target gene mRNA (or circRNA) or sequence, or may comprise a region of mismatch (i.e., a mismatch motif). Consequently, the term "RNAi agent" refers to a RNA molecule comprising a strand having a sequence sufficiently complementary to a target mRNA (or circRNA) sequence to direct target-specific RNA interference (RNAi) thereby inhibiting or down-regulating the expression of the target gene.

In certain preferred embodiments of the present invention, an RNAi agent is a siRNA (small interfering RNA), a shRNA (short hairpin RNA), a micro-RNA (micro RNA), or an aiRNA (asymmetric interfering RNA). The development of any type of RNAi agent capable of specifically silencing, inhibiting or down-regulating the expression of a given target gene (here the IL-1RA gene) is within the capabilities of one skilled in the art. The use of RNAi agents, such as siRNAs, shRNAs, micro-RNAs or aiRNAs, to inhibit gene expression is well known in the art (Cejka et al., Clin. Sci., 2006, 110: 45-58: Tuschl et al., Chembiochem., 2001, 2: 239-245).

It is also proposed that antagonists and inhibitors of IL-36RA (interleukin 36 receptor antagonist) and of IL-37 (interleukin 37) may also be useful in the treatment of chronic pathologies. IL-36RA and IL-37 are structurally and functionally closely related to IL-1RA. In fact, IL-36RA, IL-37 and IL-1RA are susceptible to replace each other or to reinforce each other's action.

TLR10 Antagonists and Inhibitors

TLR10 antagonists or inhibitors suitable for use in the therapeutic applications of the present invention include, but are not limited to, anti-TLR10 antibodies, preferably anti-TLR10 monoclonal antibodies, some of which are commercially available, for example, from MyBiosource, VWR, Abcam, Cloud-Clone, LifeSpan BioSciences, antibodies-online, R&D Systems, Novus Biologicals, Invitrogen Antibodies, Santa Cruz Biotechnology, Inc, Hycult Biotech, BioLegend, BD Biosciences, United States Biological, and Enzo Life Sciences Inc.

Other Therapeutic Agents

Other therapeutic agents useful in the therapeutic applications of the present invention include, but are not limited to, GM-CSF and INF-γ, which were found to be underexpressed, both at the transcriptome and proteome levels, in patients with the late chronic form of Lyme disease. GM-CSF has been manufactured using recombinant DNA technology and is marketed as a protein therapeutic, called molgramostim or, when the protein is expressed in yeast cells, sargramostim (marketed by Genzyme under the tradename LEUKINE®). Recombinant human INF-γ has been expressed in different expression systems including prokaryotic, protozoan, fungal (yeasts), plant, insect and mammalian cell. Human INF-γ is commonly expressed in *Escherichia coli*, and marketed as ACTIMMUNE®.

Another therapeutic agent useful in the therapeutic applications of the present invention is IL-2 (interleukin-2). Indeed, since over-expression of IL-1RA and under-expression of IFN-γ are the reflection of a deficient or inhibited immune response, IL-2 (which is ubiquitous in T lymphocytes) may be used to restore the immune response in patients, in particular in combination with antibiotics. A form of recombinant IL-2 (called Aldesleukin) is manufactured as PROLEUKIN®.

B. Indications

As indicated above, the IL-1RA therapeutic agent (or other therapeutic agent of the present invention), as described above, may be used in the treatment of a chronic pathology, as defined herein, in particular in the treatment of Lyme disease, notably in the treatment of the late chronic form of Lyme disease.

Methods of treatment of the present invention may be accomplished using an IL-1RA therapeutic agent (or other therapeutic agent of the present invention), or a pharmaceutical composition thereof. These methods generally comprise administration of a therapeutically effective amount of an IL-1RA therapeutic agent (or other therapeutic agent of the present invention), or a pharmaceutical composition thereof, to a subject in need thereof. Administration may be performed using any of the methods known to one skilled in the art. In general, the therapeutic agent, or a pharmaceutical composition thereof, is administered in a therapeutically effective amount. As used herein, the term "*therapeutically effective amount*" refers to any amount of a therapeutic agent that is sufficient to fulfil its intended purpose(s), e.g., a desired biological or medicinal response in a cell, tissue, system or subject leading the treatment of a disease. The exact amount of the therapeutic agent to be administered will vary from subject to subject, depending on the age, sex, weight and general health condition of the subject to be treated, the presence of co-infection(s), the desired biological or medical response and the like. The effects of a treatment according to the invention may be monitored using any of the diagnostic assays, tests and procedures known in the art, as well as methods described herein.

In certain embodiments, the IL-1RA therapeutic agent (or other therapeutic agent of the present invention), or a pharmaceutical composition thereof, is administered alone. In other embodiments, the IL-1RA therapeutic agent (or other therapeutic agent of the present invention), or a pharmaceutical composition thereof, is administered in combination with at least one biologically active agent. The IL-1RA therapeutic agent (or other therapeutic agent of the present invention), or pharmaceutical composition thereof, may be administered prior to administration of the biologically active agent, concurrently with the biologically active agent or procedure, and/or following administration of the biologically active agent.

Biologically active agents that may be administered in combination with the IL-1RA therapeutic agent (or other therapeutic agent of the present invention), or a pharmaceutical composition thereof, may be selected among a large variety of biologically active compounds that are known to have a beneficial effect in the treatment of a chronic pathology or to a patient in general (e.g. anti-inflammatory agents, immunomodulatory agents, analgesics, antimicrobial agents, antibacterial agents, antibiotics, antioxidants, antiseptic agents, and combinations thereof). In certain embodiments, the IL-1RA therapeutic agent (or other therapeutic agent of the present invention) is administered in combination with at least one antibiotic selected from the group consisting of macrolides (e.g., erythromycin, azithromycin, clarithromycin, synergistins, rifampicin), aminoglycosides (e.g., amikacin, gentamicin, neomycin, streptomycin), cephalosporins (e.g., cefadroxil, cefaclor, cefotaxime, cefepime, cefuroxime, ceftriaxone), fluoroquinolones (e.g., ciprofloxacin, levofloxacin), penicillins (e.g., penicillin, ampicillin, amoxicillin, minocycline), tetracyclines (e.g., tetracycline, doxycycline), and carbapenems (e.g., meropenem, imipenem).

C. Administration

The therapeutic agents as described above (optionally after formulation with one or more appropriate pharmaceutically acceptable carriers or excipients), in a desired dosage can be administered to a subject in need thereof by any suitable route. Various delivery systems are known and can be used to administer a therapeutic agent of the present invention, including tablets, capsules, injectable solutions, encapsulation in liposomes, microparticles, microcapsules, etc. Methods of administration include, but are not limited to, dermal, intradermal, intramuscular, intraperitoneal, intralesional, intravenous, subcutaneous, intranasal, pulmonary, epidural, ocular, and oral routes. A therapeutic agent, or a composition thereof, may be administered by any convenient or other appropriate route, for example, by infusion or bolus injection, by adsorption through epithelial or mucocutaneous linings (e.g., oral, mucosa, rectal and intestinal mucosa, etc). Administration can be systemic or local. Parenteral administration may be directed to a given tissue of the patient, such as by catheterization. As will be appreciated by those of ordinary skill in the art, in embodiments where the therapeutic agent is administered along with an additional biologically active agent, the IL-1RA therapeutic agent and the biologically active agent may be administered by the same route (e.g., orally) or by different routes (e.g., orally and intravenously, respectively).

Administration of a therapeutic agent (or a pharmaceutical composition thereof) according to the present invention, will be in a dosage such that the amount delivered is effective for the intended purpose. The route of administration, formulation and dosage administered will depend upon the therapeutic effect desired, the severity of the disorder being treated, the presence of any co-infection, the age, sex, weight and general health condition of the patient as well as upon the potency, bioavailability and in vivo half-life of the IL-1RA therapeutic agent (or other therapeutic agent of the present invention), the use (or not) of concomitant therapies, and other clinical factors. These factors are readily determinable by the attending physician in the course of the therapy. Alternatively or additionally, the dosage to be administered can be determined from studies using animal models. Adjusting the dose to achieve maximal efficacy based on these or other methods is well known in the art and is within the capabilities of trained physicians.

A treatment according to the present invention may consist of a single dose or multiple doses. Thus, administration of an IL-1RA therapeutic agent (or other therapeutic agent of the present invention), or a composition thereof, may be constant for a certain period of time or periodic and at specific intervals, e.g., hourly, daily, weekly (or at some other multiple day interval): monthly, yearly (e.g., in a time release form). Alternatively, the delivery may occur at multiple times during a given time period, e.g., two or more times per week, two or more times per month, and the like. The delivery may be continuous delivery for a period of time, e.g., intravenous delivery.

D. Pharmaceutical Compositions

As mentioned above, a therapeutic agent according to the present invention may be administered per se or as a pharmaceutical composition. Accordingly, the present invention provides pharmaceutical compositions comprising an effective amount of an IL-1RA therapeutic agent (or other therapeutic agent of the invention) and at least one pharmaceutically acceptable carrier or excipient. In some embodiments, the composition further comprises one or more additional biologically active agents. As used herein, the term "effective amount" refers to any amount of a therapeutic agent that is sufficient to fulfil its intended purpose(s), e.g., a desired biological or medicinal response in a cell, tissue, system or subject.

The term "*pharmaceutically acceptable carrier or excipient*" refers to a carrier medium which does not interfere with the effectiveness of the biological activity of the active ingredient(s) and which is not excessively toxic to the host at the concentration at which it is administered. The term includes solvents, dispersion media, coatings, antibacterial and antifungal agents, isotonic agents, and adsorption delaying agents, and the like. The use of such media and agents for pharmaceutically active substances is well known in the art (see for example "*Remington's Pharmaceutical Sciences*", E. W. Martin, 18th Ed., 1990, Mack Publishing Co.: Easton, PA, which is incorporated herein by reference in its entirety).

The pharmaceutical compositions of the present invention may be formulated in dosage unit form for ease of administration and uniformity of dosage. The expression "*unit dosage form*", as used herein, refers to a physically discrete unit for the patient to be treated. It will be understood, however, that the total daily dosage of the compositions will be decided by the attending physician within the scope of sound medical judgement.

Formulation

It is within the capabilities of one skilled in the art to select and use pharmaceutically acceptable media, carriers and excipients to formulate pharmaceutically active substances (see for example "Remington's Pharmaceutical Sciences", E. W. Martin, 18th Ed., 1990, Mack Publishing Co.: Easton, PA, which is incorporated herein by reference in its entirety). The IL-1RA therapeutic agents (or other therapeutic agent according to the present invention) may be formulated into injectable preparations, depot injectable preparations, liquid dosage forms, solid dosage forms, topical formulations, and the like.

Additional Biologically Active Agents

In certain embodiments, the IL-1RA therapeutic agent (or other therapeutic agent of the invention) is the only active ingredient in a pharmaceutical composition of the present invention. In other embodiments, the pharmaceutical composition further comprises one or more biologically active agents. Examples of suitable biologically active agents include, but are not limited to, anti-inflammatory agents, immunomodulatory agents, analgesics, antimicrobial agents, antibacterial agents, antibiotics, antioxidants, antiseptic agents, and combinations thereof.

In such pharmaceutical compositions, the IL-1RA therapeutic agent (or other therapeutic agent of the invention) and the at least one additional biologically active agent may be combined in one or more preparations for simultaneous, separate or sequential administration of the therapeutic agent and biologically active agent(s). More specifically, an inventive composition may be formulated in such a way that the IL-1RA therapeutic agent (or other therapeutic agent of the invention) and biologically active agent(s) can be administered together or independently from each other. For example, the IL-1RA therapeutic agent and a biologically active agent can be formulated together in a single composition. Alternatively, they may be maintained (e.g., in different compositions and/or containers) and administered separately (even if at the same time).

Further aspects and advantages of this invention will be disclosed in the following figures and examples, which should be regarded as illustrative and not limiting the scope of this application.

BRIEF DESCRIPTION OF THE DRAWING

FIG. 1. Differential expression of (A) IL-1RA, (B) IFNγ and (C) GM-CSF in chronic Lyme disease patients, reflecting active immunosuppression. Peripheral blood leukocytes (PBLs) were seeded in tissue culture plates. For T lymphocyte activation. $10^6$ PBLs/ml were cultured in RPMI1640+10% fetal calf serum supplemented with 5 µg/ml of anti-CD28 antibody (clone CD28.2) and 10 µg/ml of anti-CD3 (clone OKT3) agonist antibodies, in 24-well plates. For plastic monocyte activation, cells were grown similarly, but in the absence of anti-CD3 and CD28 antibodies to avoid T cell activation. After a 24 hour-culture period, culture supernatants were harvested and their IL-1RA. IFNγ and GM-CSF contains were determined by using ELISA kits.

FIG. 5. IL-1RA secretion (A), but not IL-1β (B), is specifically over-induced in patients PBLs activated through the Toll-like receptors recognizing the Borrelia bacteria. Many reports show that Borrelia is recognized the TLR1/TLR2 or TLR2/TLR6 pattern of recognition expressed on surface of monocytes and dendritic cells. Pam3CSK4 and FSL1 molecules can recruit these pathways, respectively, to mimic Borrelia action in these cells. LPS, a TLR4 agonist was used as a sham control. $10^6$ PBLs/ml from patients or from healthy donors were cultured in RPMI+10% FCS supplemented, or not, with the TLRs agonists for a 24-hour incubation period. IL-1RA and IL-1β concentrations were determined by using ELISAs kits from R&D Systems. The results obtained show that the recruitment of TLR1/TLR2 or TLR2/TLR6 induced secretion of tremendous amounts of IL-1RA in patient cells. This was not observed in healthy controls. In addition, IL-1β, a closely IL-1RA related gene, both structurally and by its genomic location, displayed a conventional behaviour in response to the used stimuli.

EXAMPLES

Figure 2B:
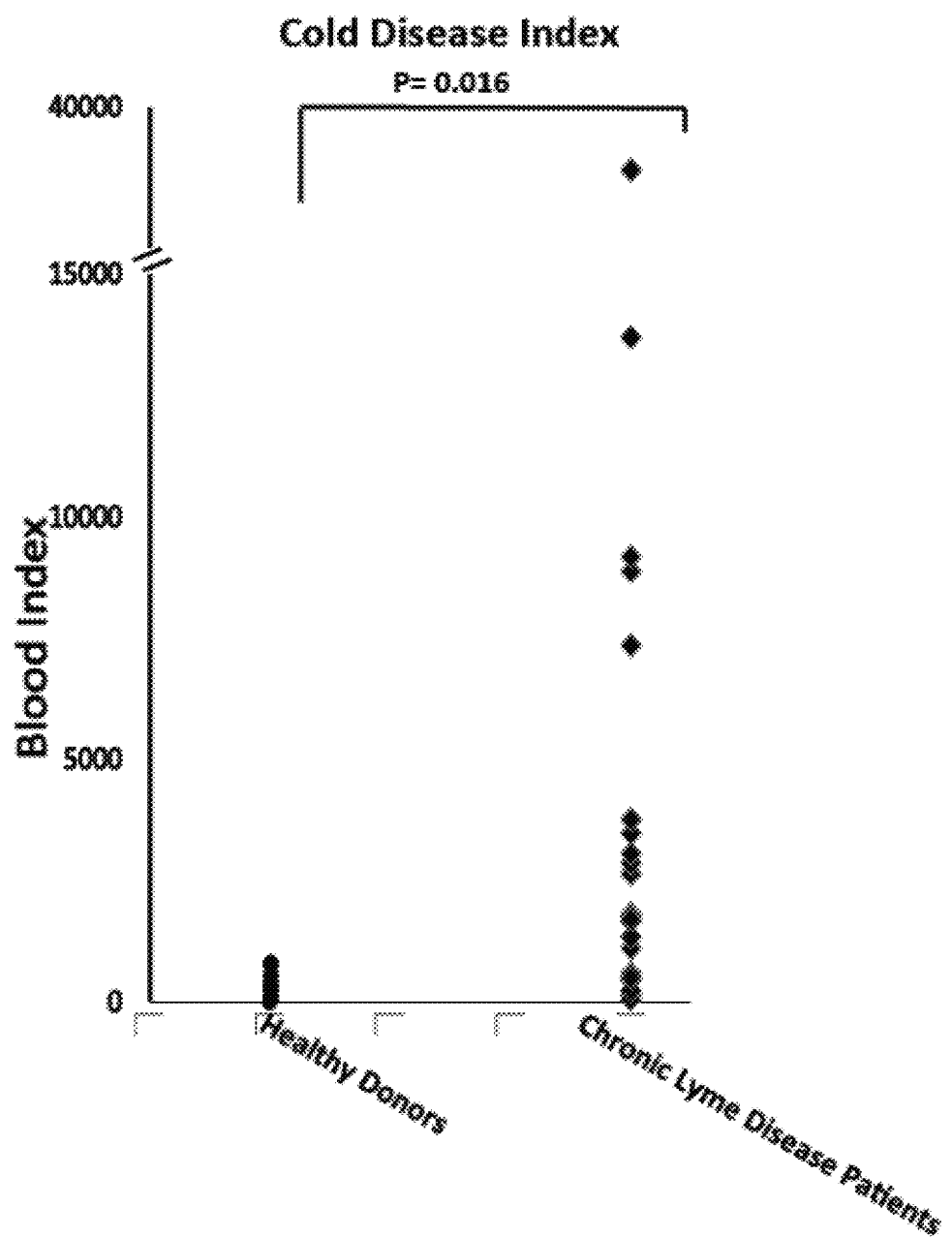
FIG. 2. (A) Screen shot of the very first determination of Cold Disease Index 1. Rough data obtained from IL-1Ra. IFN-γ ELISA determination and expressed in pg/ml. The white lines correspond to the values obtained for the healthy controls, and the light and dark grey lines are from to Borrelia seropositive and seronegative patients, respectively. The three black lines corresponding to patients previously excluded because of poly-pathologies. The last column on the right presents the [IL-1RA]/[IFNγ] ratio (i.e., Cold Disease Index 1), with a p-Value=0.016. (B) Dot plot representation of Cold Disease Index 1. [IL-1RA]/[IFNγ] in healthy persons is compared to [IL-1RA]/[IFNγ] in patients suffering from chronic Lyme disease, with a p-Value=0.016.

The following examples describe some of the preferred modes of making and practicing the present invention. However, it should be understood that the examples are for illustrative purposes only and are not meant to limit the scope of the invention. Furthermore, unless the description in an Example is presented in the past tense, the text, like the rest of the specification, is not intended to suggest that experiments were actually performed or data were actually obtained.

Materials and Methods

Biological Samples. Blood samples were collected from healthy adult donors and late disseminated form Lyme disease suffering adult patients. All samples were obtained after informed consent forms were signed, according to the French rules. Patients were selected based on, at least, the following criteria: polyarthralgias migrating from one joint to another, chronic desocializing tiredness, muscular or osteo-muscular pain, loss of cerebral concentration and anterograde memory problems. Some of the patients also displayed more severe problems such as motor impairments. Half of the patient population was selected based on a positive serology for Borrelia, the other half was seronegative (see Table 1). Peripheral blood leukocytes (PBLs) were isolated by Ficoll-Paque PLUS (GE Healthcare) density centrifugation. Interface cells were harvested, washed twice in RPMI 1640+10% foetal calf serum before being frozen in the presence of a final concentration of 10% DMSO at −80° C., and then in liquid nitrogen. Serum samples were also preserved, and PBL snap frozen pellets were prepared for DNA analyses. During the time course of the project, the company DiagNucleis Plateforme de diagnostic (diagnucleis.fr) brought the possibility of looking at the blood level for the presence of different forms of Borrelia, bacteria co-infecting the Lyme patients, as well as the parasite Babesia, by using ultra sensitive PCRs. Blood samples sent to this company were analysed and completed the serological results, showing that at least 27 of the 28 studied patients had a pathology associated with Lyme disease (see Table 2). Nevertheless, due to poly-pathologies, three of the patients were excluded from the study.

Gene Expression and Transcriptome Analysis. Total RNA was extracted from PBLs using an RNeasy Micro kit (Qiagen, Valencia, CA) according to the manufacturer's information. One microgram of total RNA was reversed transcribed into cDNA using random hexamer primers and the SuperScript II reverse transcriptase (Invitrogen). Samples were further analyzed using the PrimeView Human Genome U219 Array technology from Affymetrix/Thermo FisherScientific (Waltham, MA), following the manufacturer protocol. This allowed measurement of gene expression of about 36,000 transcripts and variants in each sample. Plastic activated mononuclear cells and activated T cells were studied both in Lyme patients and healthy donors, and the obtained gene expression profiles were compared by computed analyses.

Tissue Culture and Cell Activation. For T lymphocyte activation, $10^6$ PBLs/ml were cultured in RPMI1640+10% foetal calf serum supplemented with 5 µg/ml of anti-CD28 antibody (clone CD28.2) and 10 µg/ml of anti-CD3 (clone OKT3) agonist antibodies, in 24-well plates.

For plastic monocyte activation, cells were grown similarly, but in the absence of anti-CD3 and CD28 antibodies avoiding any T cell activation. After a 24 hour-culture period at 37° C., culture supernatants were recovered and stored at −80° C. up until protein determination. For RNA expression analyses, the tissue culture period of samples was shortened to 6 hours, and cells were snap frozen.

ELISA determination, and reagents. Concentrations of IL-1Ra, IFNγ, GM-CSF and IL-1β present in culture supernatants were determined by using ELISA kits commercialized by R&D Systems (Abingdon, UK), following the manufacturer recommendations. Lipopolysaccharide (LPS) a TLR4 agonist was obtained from Sigma (Saint-LouisMO). FSL-1, a TLR2/TLR6 agonist and Pam3CSK4, a TLR1/TLR2 agonist, were both obtained from Invivogen (San Diego, CA). ,

TABLE 1

Samples from Patients and Healthy Individuals.

| Sample Name | Birth Date Day/month/year | Gender | C.E. | Date of Sample Collection | ELISA | W. BLOT | AUTRES |
|---|---|---|---|---|---|---|---|
| Lym001 | 9 May 1983 | F | yes | 12 Mar. 2016 | − | − | EXCLU poly p. |
| Lym002 | 27 Sep. 1982 | F | yes | 12 Mar. 2016 | − | p41 +/− | DNA arrays |
| Lym003 | 6 Feb. 1962 | M | yes | 12 Mar. 2016 | − | + | |
| Lym004 | 15 May 1962 | M | yes | 12 Mar. 2016 | + | + | |
| Lym005 | 24 Nov. 1974 | F | yes | 12 Mar. 2016 | + | + | |
| Lym006 | 5 Apr. 1990 | M | yes | 12 Mar. 2016 | − | P41 +/− | DNA arrays |
| Lym007 | 30 Apr. 1984 | F | yes | 12 Mar. 2016 | − | P41 +/− P39+/− | |
| Lym008 | 7 Apr. 1973 | F | yes | 12 Mar. 2016 | + | + | |
| Lym009 | 28 Jul. 1982 | F | yes | 2 Apr. 2016 | − | P41 +/− | EXCLU poly p. |
| Lym010 | 24 Feb. 1960 | F | yes | 2 Apr. 2016 | − | + | |
| Lym011 | 31 May 1967 | F | yes | 2 Apr. 2016 | + | + | |
| Lym012 | 1 Jan. 1977 | F | yes | 2 Apr. 2016 | − | − | |
| Lym013 | 13 Dec. 1986 | F | yes | 2 Apr. 2016 | + | + | |
| Lym014 | 1 Mar. 1983 | M | yes | 2 Apr. 2016 | + | + | |
| Lym015 | 1 Feb. 1971 | M | yes | 2 Apr. 2016 | + | + | |
| Lym016 | 21 Sep. 1985 | F | yes | 2 Apr. 2016 | − | − | EXCLU poly p. |
| Lym017 | 13 Oct. 1951 | F | yes | 2 Apr. 2016 | − | p41+/− | DNA arrays |
| Lym018 | 3 May 1967 | F | yes | 2 Apr. 2016 | − | p41 +/− | DNA arrays |
| Lym019 | 7 Nov. 1986 | M | yes | 2 Apr. 2016 | − | − | |
| Lym020 | 25 Oct. 1970 | F | yes | 2 Apr. 2016 | + | + | |
| Lym021 | 3 Mar. 1984 | F | yes | 2 Apr. 2016 | − | − | |
| Lym022 | 8 Feb. 1972 | F | yes | 2 Apr. 2016 | + | + | |
| Lym023 | 23 Apr. 1993 | F | yes | 14 May 2016 | + | + | |
| Lym024 | 24 Mar. 1966 | F | yes | 14 May 2016 | + | + | |
| Lym025 | 21 Jan. 1981 | F | yes | 14 May 2016 | + | + | |
| Lym026 | 14 May 1961 | F | yes | 14 May 2016 | + | + | |
| Lym027 | 3 Oct. 1972 | F | yes | 14 May 2016 | + | + | |
| Lym028 | 24 Jan. 1980 | M | yes | 14 May 2016 | + | + | |
| T1 | 18 Sep. 1991 | M | yes | | − | ND | DNA arrays |
| T2 | 15 Jun. 1982 | F | yes | | − | ND | DNA arrays |
| T3 | 26 May 1991 | M | yes | | − | ND | DNA arrays |
| T4 | 10 Apr. 1991 | M | yes | | − | ND | DNA arrays |
| T5 | 24 Feb. 1984 | F | yes | | − | ND | |
| T6 | 10 Apr. 1992 | M | yes | | − | ND | |
| T7 | 26 Mar. 1988 | F | yes | | − | ND | |
| T8 | 5 Jul. 1990 | M | yes | | − | ND | |
| T9 | 7 Feb. 1989 | F | yes | | − | ND | |
| T10 | 24 Oct. 1991 | F | yes | | − | ND | |
| T11 | 20 Sep. 1989 | F | yes | | − | ND | |
| T12 | 30 Aug. 1990 | F | yes | | − | ND | |

N.D.: Not determined.
+: positif.
−: negative.

TABLE 2 qPRC Analysis of Blood Samples in Patients with Chronic Lyme Disease

| Sample name | Borrelia senso lato | Bartonella | Anaplasma | Babesia | Borrelia ELISA | Borrelia W. B. |
|---|---|---|---|---|---|---|
| Lym001 | + | N.D. | N.D. | N.D. | − | − |
| Lym002 | + | N.D. | N.D. | N.D. | − | p41 +/− |
| Lym003 | + | N.D. | N.D. | N.D. | − | + |
| Lym004 | N.D. | N.D. | N.D. | 6.3E+4 | + | + |
| Lym005 | + | N.D. | N.D. | 6.2E+4 | + | + |
| Lym006 | N.D. | N.D. | N.D. | N.D. | − | P41 +/− |
| Lym007 | + | N.D. | + | 5.4E+4 | − | P41+/− P39+/− |
| Lym008 | + | N.D. | N.D. | N.D. | + | + |
| Lym009 | N.D. | N.D. | N.D. | 2.5E+4 | − | P41 +/− |
| Lym010 | N.D. | N.D. | N.D. | 5.1E+4 | − | + |
| Lym011 | + | 10E+5 | N.D. | N.D. | + | + |
| Lym012 | N.D. | N.D. | N.D. | 6.2E+4 | − | − |
| Lym013 | + | N.D. | N.D. | 6.1E+4. | + | + |
| Lym014 | + | N.D. | N.D. | 5.4E+4 | + | + |
| Lym015 | N.D. | N.D. | N.D. | 4.3E+4 | + | + |
| Lym016 | + | N.D. | + | 5.5E+4 | − | − |
| Lym017 | + | N.D. | N.D. | N.D. | − | p41+/− |
| Lym018 | N.D. | N.D. | N.D. | 3.2E+4 | − | p41 +/− |
| Lym019 | N.D. | N.D. | N.D. | 6.5E+4 | − | − |
| Lym020 | N.D. | N.D. | N.D. | 5.3E+4 | + | + |
| Lym021 | N.D. | N.D. | N.D. | N.D. | − | − |
| Lym022 | N.D. | N.D. | N.D. | 3.9E+4 | + | + |
| Lym023 | N.D. | N.D. | N.D. | N.D. | + | + |
| Lym024 | N.D. | N.D. | N.D. | N.D. | + | + |
| Lym025 | N.D. | N.D. | N.D. | N.D. | + | + |
| Lym026 | N.D. | N.D. | N.D. | N.D. | + | + |
| Lym027 | N.D. | N.D. | N.D. | 2.9E+5. | + | + |
| Lym028 | N.D. | N.D. | N.D. | 5.8E+4 | + | + |

N.D.: Not determined.
+: positif.
−: negative.

Results

The present Inventors have analyzed the functional expression of the genome of circulating leukocytes in patients exhibiting a clinical picture characteristic of the late chronic phase of Lyme disease. This allowed them to demonstrate a major defect in the patients' response to the pathogen, which results in severe immunosuppression in the patients' tissue inflammatory response.

Transcriptome Analysis

Following isolation, mRNAs were hybridized to DNA chips containing more than 50,000 different cDNA targets, thus covering the entire genome and a large majority of the mRNA splicing. The Inventors have analyzed, on the one hand: the functioning of monocytes/macrophages/dendritic cells, and on the other hand: the functioning of T lymphocytes, after stimulating them by contact with plastic for 6 hours, or by recruitment of the CD3/CD28 pathways, respectively. The goal of the stimulation step is to amplify the level of functioning of genes already active in the patient.

This allowed the identification of genes that are over- or under-expressed in the patients compared to healthy subjects (data not shown). The genes that were found to be upregulatede are IL-1RA (interleurkin-1 antagonist receptor), SSP1 (secreted phosphoprotein 1 or osteopontin), APOBEC3B (apolipoprotein B mRNA editing enzyme catalytic subunit 3B), TNFAIP6 (tumor necrosis factor-inducible gene 6 product), CCL20 (C-C motif chemokine 20), IL-6 (interleurkin-6), Oncostatin M (OSM), C3 (complement component 3), and RGS16 (regulator of G-protein signaling). The genes that were found to be downregulated are IFNγ (interferon gamma), GM-SCF (granulocyte-macrophage colony-stimulating factor), AFF3 (AF4/FMR2 family member 1), 20 alpha (3alpha)-HSD (AKR1C1), CD163 (cluster differentiation 163), IL-13 (interleukin-13), CCL8 (chemokine C-C motif ligand 8), IL-22 (interleukin 22), IL-17F (interleukin 17F), IL-17A (interleukin-17A), and IL-3 (interleukin-3).

The identified genes are often immunosuppressive genes, in particular in monocytes/macrophages/dentritic cells, and whose expression level displays a 5-fold or 10-fold increase compared to healthy subjects. In the analysis of the results, the present Inventors focused on identified genes whose variation was found to be homogeneous for each group and in all the cell populations studied.

In chronic Lyme disease patients, the myelo/monocytic/dendritic lineage was found to overexpress, in particular, the interleukin-1 receptor antagonist (IL-1RA), osteopontin (SSP1) or TNF-stimulated gene 6, each of which has different degrees of immunomodulation capabilities. Similarly, the chemokine CCL20/MIP3α, which is involved in immune responses of the inflammatory tissue type, referred to as Th17, was also found to be overexpressed. On the other hand, apart from a rather homogeneous small subexpression of the CD163 and ANFF3 molecules, the Inventors have not noticed a significant down-regulation of genes at the monocytic level in chronic Lyme disease patients compared to healthy individuals.

As far as T lymphocytes (activated through the CD3/CD28 pathways), the results obtained are practically symmetrical. Namely, the Inventors have not detected genes whose expressions by T cells are homogeneously and specifically increased in chronic Lyme disease patients compared to healthy controls. On the other hand, a strong repression of gene expression was observed in a series of 4 T-response genes, in particular IL-17A, IL-17F and IL-22, which are specific markers of tissue inflammatory lymphocytic immune response (Th17). This means that in chronic Lyme disease patients, unlike healthy subjects, the Th17 response that occurs at the tissue level, particularly in the anti-bacterial response, is tremendously inhibited. Along with IL-17A, IL-17F and IL-22, another T-cell marker, interleukin-3, involved in emergency recruitement and myeloid cell maturation, was also found to be deeply repressed.

Once identified by DNA chips, some markers, including IL-1RA, osteopontin, CCL20/MIP3α, were reanalyzed using quantitative PCR on all available biological samples (from 28 chronic Lyme disease patients and as many as healthy subjects) in order to confirm the homogeneity of the first experimental results obtaine. The same information was acquired by PCR analysis. Furthermore, there were no differences in the gene expressions measured for the seropositive patients and for the seronegative patients (this was also the case at the protein level). This means that the presence of antibodies is not an essential element of the immune response in the patients suffering from the late chronic form of Lyme disease.

Proteome Analysis

After having identified a number of transcripts, including cytokines related to the immune response, the present Inventors have measured the concentrations of the corresponding proteins. For this purpose, the leucocytes were activated by contact on plastic and the T lymphocytes were recruited by the CD3/CD28 pathways for 24 hours of culture at 37° C. The supernatants of these cultures were then recovered and the concentration of the different soluble cytokines or molecules was determined by ELISA.

Preliminary experiments have focused on dosing IL-1RA, osteopontin, CCL20/MIP3α on the one hand, and IL-3 and IL-17A on the other hand. This list was supplementred with a few other cytokines known to be involved in the Th17 (and/or Th1) response, in particular interferon gamma (IFN-γ), and GM-CSF, two of the genes that are essential to the Th1 and Th17 responses). In addition, IFN-γ is known for its mRNA complex regulation, which can lead to a short half-life of its RNAs under certain circumstances, decoupling the mRNA measurement from the corresponding protein concentrations.

The present Inventors have also considered GM-CSF (which is structurally similar to IL-3, whose expression was observed to decrease by almost 2-fold in chronic Lyme disease patients compared to healthy subjects), as well as the IL-36 inhibitor (which is structurally or functionally close to IL-1RA). The data obtained at the protein level on all patients corroborate those obtained at the mRNA level, with the exception of IL-17A, where a net decrease was not observed in patients at the protein level (at least in the preliminary experiments presented here). Although the IL-36 receptor assay did not provide any new data: in contrast, the levels of GM-CSF and even more of IFN-γ were found to be significantly decreased in chronic Lyme disease patients compared to healthy subjects. In the myelocytic monocyte line, a very high increase of the amount of IL-1RA was observed in patients compared to healthy individuals (see FIG. 1).

Cold Disease Indexes

The results obtained led the Inventors to define two "indexes", which were called "Cold Disease Index 1" and "Cold Disease Index 2". The term "Cold Disease" has been used in reference to the French term "infection froide" ("cold infection" in English), which encompasses dormant, asymptomatic or latent infections, which are capable of manifesting symptoms under particular circumstances or if activated.

"Cold Disease Index 1" (or "CD1") corresponds to [IL-1RA]/[IFN-γ], the ratio between the expression level of IL-1RA and the expression level of IFN-γ, and "Cold Disease Index 2" (or "CD2") corresponds to [IL-1RA]/[GM-CSF], the ratio between the expression level of IL-1RA and the expression level of GM-CSF.

If the CDI is set to 1 in healthy individuals, the ratio [IL-1RA]/[IFN-γ] was found to reach values between 100 and 1000 in more than 95% of the chronic Lyme disease patients tested, and the value of CD1 was found to increase as the severity of the disease increases (with a confidence interval of p=0.01) (see FIG. 2).

Figure 3:
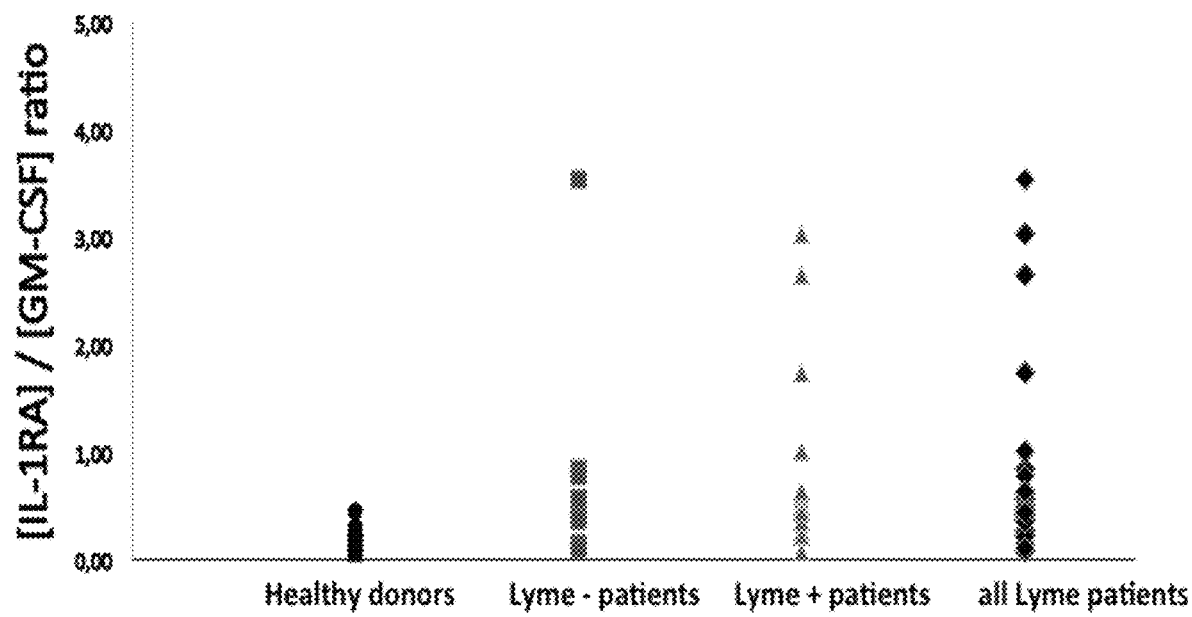
FIG. 3. Dot plot representation of Cold Disease Index 2. The ratio [IL-1RA]/[GM-CSF] for by PBLs cultured for 24 hours as described in the caption of FIG. 1 was determined and compared to ratio [IL-1RA]/[GM-CSF] measured in Lyme seronegative patients. Lyme seropositive patients and the group of combined patients. P value between healthy donors and total Lyme patients is p=0.008.

If the CD2 is set to 1 in healthy individuals, the ratio [IL-1RA]/[GM-CSF] was found to be vary from 1 to 10 in chronic Lyme disease patients with a confidence of p=0.008 (see FIG. 3).

Figure 4:
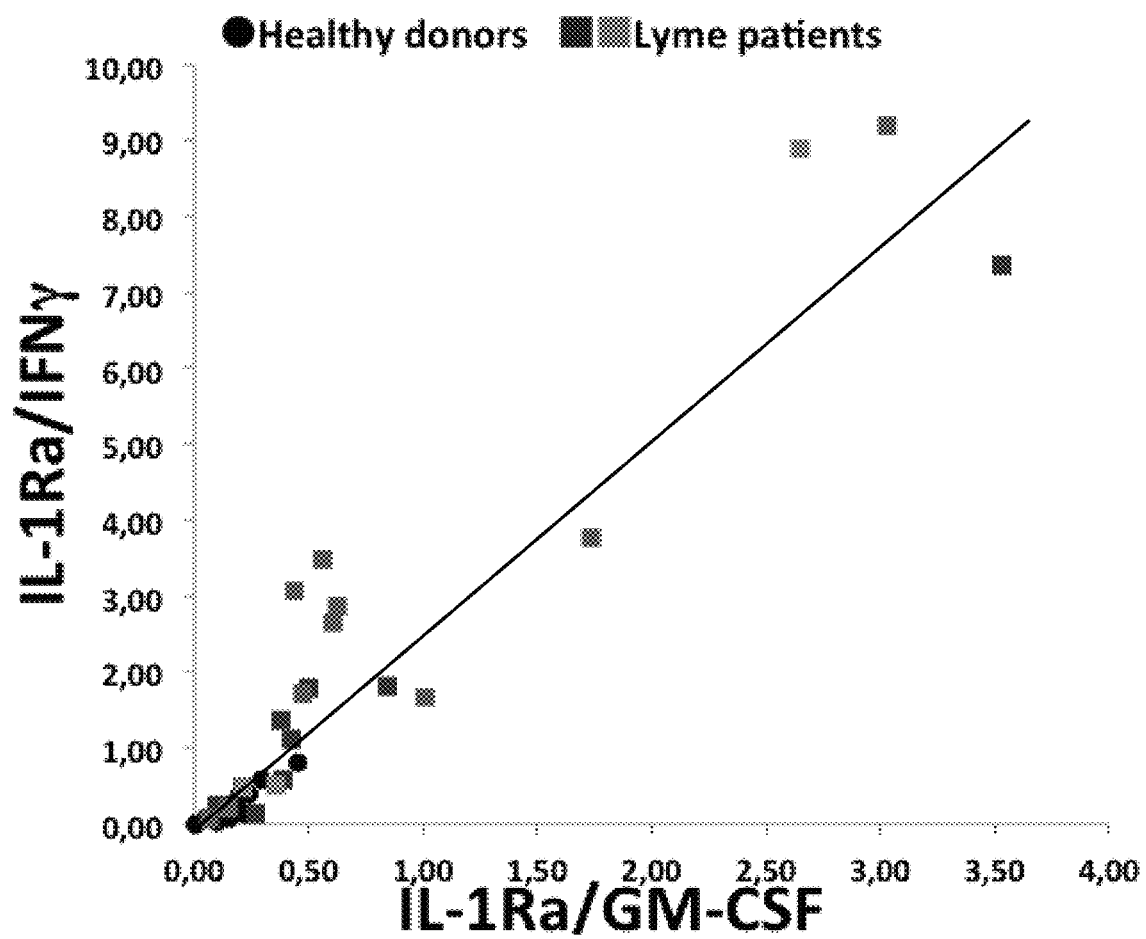
FIG. 4. Dot plot representation and comparison of Cold Disease Index 1 and Cold Disease Index 2. The values of [IL-1RA]/([IFNγ] (Cold Disease Index 1) and of [IL-1RA]/[GM-CSF] (Cold Disease Index 2) measured for Lyme patients and for healthy controls were plotted on vertical and horizontal axes, respectively, and compared.

A two-dimensional representation, with CD1 presented on the y-axis and CD2 presented on the x-axis, leads to the alignement of the values, which define a straight line (see FIG. 4). This demonstrates that the parameters are indeed related to each other in the immune response in the late chronic form of Lyme disease, further reinforcing the weight of the observations made.

To the Inventors' knowledge, CD1 and CD2 are the first evidence of a solid, quantifiable proof of a biological defect in the late chronic form of Lyme disease.

IL-1RA Biology in the Context of Lyme Disease

Among the three cytokines assayed, IL-1RA, IFN-γ and GM-CSF, the increase in IL-1RA expression was found to be the most dramatic, and could not have been expected. It should be emphasized that IL-1RA is a potent antagonist of both forms of IL-1, the alpha and beta forms, and contributes to the strong inhibition of the immune response at the B-lymphocyte level (hampering its ability to produce antibodies, and also decreasing part of the synthesis of the so-called "acute phase" proteins synthesized by the liver during aggression by an organism, which contribute to the "innate" defense response). This is, in particular, the case of the C-Reaction Protein (CRP), a front-line marker of inflammation in routine analyses, which is very often absent ou present at very low levels in patients with the late chronic form of Lyme disease. Moreover, it has been shown that a synthetic form of IL-1RA (called Anakinra), used as therapeutics in a context that is totally different from Lyme disease, actually leads to a reduction in the synthesis of CRP in man. In humans, IL-1 is also a cytokine that, in combination with IL-23, is essential for polyrization of CD4+ cells toward so-called Th17 cells, which are characteristics of lymphoid tissue inflammation. The role of the Th17, then at the sites, is to eliminate bacteria infiltrating the tissues. The transcriptome analysis has identified several specific markers of the presence of recirculating Th17 in patients. On the other hand, their functionality remains strongly altered, and the expression of their main functional genes (IL-17A, Il-17F and IL-22) is strongly repressed in chronic Lyme disease patients compared to healthy individuals. This probably contributes to explain the inability of said patients to achieve an effective clearance of the pathogen at the tissue level. In addition, IL-1RA neutralized the pyrogenic properties of both IL-1α and IL-1β, which were the main endogenous fever inducers in human: and patients suffering of chronic Lyme disease usually do not have fever, and often even display a small hypothermia.

In rodent models of inactivation, or overactivation, of IL-1RA in the central nervous system, it has been established that this molecule also plays a major role in the acquisition of short memory—a type of memory that is highly impaired in chronic Lyme disease patients and which is, along with desocializing tiredness, and multifocal arthralgias, one of the main symptoms of the late form of the disease.

TLRs and Borrelia

Borrelia is known to enter the body by "sensors" called Toll-like Receptors (TLRs) and located on the surface of monocytes, macrophages or dendritic cells (and sometimes on certain populations of T lymphocytes). TLRs are the first line of defense against pathogens, which are identified as exogenous on the basis of their electrical charges, their hydrophobicity, the presence of atypical sugars, or specific traits of the pathogenic nuleic acids (mono-stranded RNAs, bacterial DNA methylation, etc. . . . ). If most TLRs are expressed at the surface of the cells, some are also present in the endosome, associated with NOD family molecules, and contribute to clearance of virus and intracellular bacteria (mycobacteria, etc. . . . ).

At the membrane level, TLRs can be paired to increase their recognition capabilities. Thus, the Borrelia bacterium is recognized by the TLR1/TLR2 and TLR2/TLR6 pairs. The bacterium attachment to the TLRs strengthens the pairing, which then transmits an intracellular signal initiating a signaling cascade, which ultimately leads to the expression of the genes that are necessary to induce an efficient immune response. The recruitment of TLR genes by bacteria generally leads to abundant synthesis of IL-1β, IL-6 and IL-8, for example, but also, and sometimes more moderately, of IL-1RA. The latter molecule (as well as IL-10 or TGF-β) is then responsible for lowering the immune response and for a return to homeostasis once the antigen has been eliminated.

Besides Borrelia, other bacteria, such as mycobacteria, for example, recruit TLR1/TLR2 and TLR2/TLR6. On the other hand, TLR4, another important sensor of bacteria expressing lypopolysaccharides (LPS), absent in Borrelia, is not recognized by Borrelia. The present Inventors have sought to dissect the activation of TLRs by Borrelia, in order to determine if these pathways were indeed responsible for IL-1RA hypersecretion. In order to distinguish the response of the different TLRs, they have taken advantage of the fact that certain chemical molecules are known to specifically bind and activate one of the TLRs. Thus, for example, TLR4 is activated by LPS (used as control), TLR1/TLR2 is activated by the chemical agent: Pam3CSK4, and TLR2/TLR6 is activated by FSL-1.

These three molecules were added, for 24 hours, to mononuclear blood cell cultures from patients with the late chronic form of Lyme disease (n=6) and from healthy subjects (n=6), and the supernatants were assayed for IL-1RA concentrations. The results obtained are presented in FIG. 5.

The first observation is that IL-1RA is strongly overexpress by the cells of chronic Lyme disease patients compared to the cells of healthy individuals. Regardless of the nature of the agent stimulating the TLRs of the patients, the overexpression reaches very inhabitual concentrations of 50-70 ng/ml, compared to 10-15 ng/ml for the controls (see FIG. 5(A)).

The deregulation of the IL-1RA gene was then analyzed with respect to the IL-1β agonist, which often exhibits a joint regulation with IL-1RA. The pathway used as a control, which combines LPS and TLR4, led to an increased expression of IL-1β secretion (about 10 ng/ml), identical for patients and healthy controls. On the other hand, activation of the TLR1/TLR2 and TLR2/TLR6 pathways recruited by *Borrelia*, did not lead to a significant increase in IL-1β, which does not exceed ~1 ng/ml. This result is important since it means that, in chronic Lyme disease patients, the quantities of antagonist (IL-1RA) produced is 50 to 70 times greater than the quantities of IL-1β. This contributes to better explain the deficiency observed in the immune response of patients, and a fortiori with a shart decline in IFN-γ production, one of the pillars of the antibacterial response.

The invention claimed is:

1. A method for treating a late chronic form of Lyme disease in a subject, said method comprising steps of:
   (A) verifying that the subject has a late chronic form of Lyme disease; and
   (B) administering, to the subject, a treatment for late chronic form of Lyme disease comprising a therapeutically effective amount of an IL-RA therapeutic agent selected from the group consisting of IL-1α, IL-1β, anti-IL-1RA antibodies, and anti-IL-1RA interfering agents, wherein verifying that the subject has a late chronic form of Lyme disease comprises steps of:
   (a) determining, in a biological sample obtained from said subject, an expression level of IL-1RA and an expression level of IFN-γ; and
   (b) calculating a ratio [IL-1RA]/[IFN-γ] between the expression level of IL-1RA and the expression level of IFN-γ determined in step (a); and
   (c) comparing the ratio [IL-1RA]/[IFN-γ] calculated in step (b) with a ratio [IL-1RA]/[IFN-γ] determined using a biological sample obtained from a healthy subject or with a predetermined threshold ratio [IL-1RA]/[IFN-γ]$_0$, wherein the healthy subject does not have a pathology or an infection,
   wherein the ratio [IL-1RA]/[IFN-γ] calculated in step (b) that is higher than the ratio [IL-1RA]/[IFN-γ] determined for the healthy subject, or that is higher than the predetermined threshold ratio [IL-1RA]/[IFN-γ]$_0$, is indicative of the late chronic chronic form of Lyme disease;
   and/or comprises steps of:
   (a') determining, in a biological sample obtained from said subject, an expression level of IL-1RA and an expression level GM-CSF;
   (b') calculating a ratio [IL-1RA]/[GM-CSF] between the expression level of IL-1RA and the expression level of GM-CSF determined in step (a'); and
   (c') comparing the ratio [IL-1RA]/[GM-CSF] calculated in step (b') with a ratio [IL-1RA]/[GM-CSF] determined using a biological sample obtained from a healthy subject or with a predetermined threshold [IL-1RA]/[GM-CSF]$_0$, wherein the healthy subject does not have a pathology or an infection,
   wherein the ratio [IL-1RA]/[GM-CSF] calculated in step (b') that is higher than the ratio [IL-1RA]/[GM-CSF] determined for a healthy subject, or that is higher than the predetermined threshold ratio [IL-1RA]/[GM-CSF]$_0$, is indicative of the late chronic form of Lyme disease.

2. The method according to claim 1, wherein the biological sample is a blood sample.

3. The method according to claim 1, wherein determining the expression level of IL-1RA, IFN-γ or GM-CSF in the biological sample includes measuring an amount or concentration of IL-1RA mRNA, IFN-γ mRNA or GM-CSF mRNA in the biological sample or measuring an amount or concentration of IL-1RA protein, IFN-γ protein or GM-CSF protein in the biological sample.

4. The method according to claim 1 comprising, following steps (A) and (B), steps of:
   (C) assessing a response of the subject to the treatment for late chronic form of Lyme disease, wherein said assessing comprises steps of:
   (1) determining a ratio [IL-1RA]/[IFN-γ] according to steps (a) and (b), in a biological sample obtained from said subject before administration of the treatment;
   (2) determining a ratio [IL-1RA]/[IFN-γ] according to steps (a) and (b), in a biological sample obtained from said subject after administration of the treatment has started; and
   (3) comparing the ratio [IL-1RA]/[IFN-γ] determined in (1) and the ratio [IL-1RA]/[IFN-γ] determined in (2) to assess the response of said subject to said treatment, wherein the ratio [IL-1RA]/[IFN-γ] determined in (2) that is lower than the ratio [IL-1RA]/[IFN-γ] determined in (1) is indicative of a subject that is responsive to the treatment, and the ratio [IL-1RA]/[IFN-γ] determined in (2) that is equal to or higher than the ratio [IL-1RA]/[IFN-γ] determined in (1) is indicative of a subject that is non-responsive to the treatment;
   and/or comprises steps of:
   (1') determining a ratio [IL-1RA]/[GM-CSF] according to steps (a') and (b'), in a biological sample obtained from said subject before administration of the treatment;
   (2') determining a ratio [IL-1RA]/[GM-CSF] according to steps (a') and (b'), in a biological sample obtained from said subject after administration of the treatment has started; and
   (3') comparing the ratio [IL-1RA]/[GM-CSF] determined in (1') and the ratio [IL-1RA]/[GM-CSF] determined in (2') to assess the response of said subject to said treatment, wherein the ratio [IL-1RA]/[GM-CSF] determined in (2') that is lower than the ratio [IL-1RA]/[GM-CSF] determined in (1') is indicative of a subject that is responsive to the treatment, and the ratio [IL-1RA]/[IFN-γ] determined in (2') that is equal to or higher than the ratio [IL-1RA]/[IFN-γ] determined in (1') is indicative of a subject that is non-responsive to the treatment; and
   (D) adapting the treatment if said subject is non-responsive to the treatment for late chronic form of Lyme disease, wherein adapting the treatment comprises at least one of: increasing a dose of said treatment; modifying an administration mode of said treatment, stopping said treatment, and administering a different treatment for late chronic form of Lyme disease to said subject; or maintaining the treatment for the late chronic form of Lyme disease if the subject is responsive.

5. The method according to claim 1 comprising, following steps (A) and (B), steps of:
   (C) monitoring the subject post-treatment, wherein said monitoring comprises steps of:
   (1) determining a ratio [IL-1RA]/[IFN-γ] according to steps (a) and (b), in a biological sample obtained from said subject before administration of the treatment;
   (2) determining a ratio [IL-1RA]/[IFN-γ] according to steps (a) and (b), in a biological sample obtained from said subject after administration of the treatment has started;
   (3) comparing the ratio [IL-1RA]/[IFN-γ] determined in (1) and the ratio [IL-1RA]/[IFN-γ] determined in (2) to assess the response of said subject to said treatment, wherein the ratio [IL-1RA]/[IFN-γ] determined in (2) that is lower than the ratio [IL-1RA]/[IFN-γ] determined in (1) is indicative of a subject that is responsive to the treatment, and the ratio [IL-1RA]/[IFN-γ] determined in (2) that is equal to or higher than the ratio [IL-1RA]/[IFN-γ] determined in (1) is indicative of a subject that is non-responsive to the treatment;

(4) determining a ratio [IL-1RA]/[IFN-γ] according to steps (a) and (b), in a biological sample obtained from said subject post-treatment; and (5) comparing the ratio [IL-1RA]/[IFN-γ] determined in (2) and the ratio [IL-1RA]/[IFN-γ] determined in (4) to monitor said subject post-treatment, wherein the ratio [IL-1RA]/[IFN-γ] determined in (4) that is higher than the ratio [IL-1RA]/[IFN-γ] determined in (2) is indicative of a relapse of the late chronic form of Lyme disease in said subject;

and/or comprises steps of:

(1') determining a ratio [IL-1RA]/[GM-CSF] according to steps (a') and (b'), in a biological sample obtained from said subject before administration of the treatment;

(2') determining a ratio [IL-1RA]/[GM-CSF] according to steps (a') and (b'), in a biological sample obtained from said subject after administration of the treatment has started;

(3') comparing the ratio [IL-1RA]/[GM-CSF] determined in (1') and the ratio [IL-1RA]/[GM-CSF] determined in (2') to assess the response of said subject to said treatment, wherein the ratio [IL-1RA]/[GM-CSF] determined in (2') that is lower than the ratio [IL-1RA]/[GM-CSF] determined in (1') is indicative of a subject that is responsive to the treatment, and the ratio [IL-1RA]/[IFN-γ] determined in (2') that is equal to or higher than the ratio [IL-1RA]/[IFN-γ] determined in (1') is indicative of a subject that is non-responsive to the treatment;

(4') determining a ratio [IL-1RA]/[GM-CSF] according to steps (a') and (b'), in a biological sample obtained from said subject post-treatment; and (5') comparing the ratio [IL-1RA]/[GM-CSF] determined in (2') and the ratio [IL-1RA]/[GM-CSF] determined in (4') to monitor said subject post-treatment, wherein the ratio [IL-1RA]/[GM-CSF] determined in (4') that is higher than the ratio [IL-1RA]/[GM-CSF] determined in (2') is indicative of a relapse of the late chronic form of Lyme disease in said subject; and (D) determining that the subject has a relapse of the late chronic form of Lyme disease in step (5) and/or step (5') and administering the treatment for late chronic form of Lyme disease to the subject with the relapse of the late chronic form of Lyme disease.

* * * * *